United States Patent
Zivanovic et al.

(10) Patent No.: US 10,247,223 B2
(45) Date of Patent: Apr. 2, 2019

(54) MULTI-GLIDE LOCKING SNAP HOOK FASTENER

(71) Applicant: Travel Caddy, Inc., Elk Grove Village, IL (US)

(72) Inventors: Slobodan S. Zivanovic, Des Plaines, IL (US); Donald E. Godshaw, Wilmette, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 103 days.

(21) Appl. No.: 14/994,874

(22) Filed: Jan. 13, 2016

(65) Prior Publication Data

US 2016/0208845 A1   Jul. 21, 2016

Related U.S. Application Data

(60) Provisional application No. 62/104,717, filed on Jan. 17, 2015.

(51) Int. Cl.
  *F16B 45/04* (2006.01)
  *A45C 13/30* (2006.01)
  *A45F 5/02* (2006.01)

(52) U.S. Cl.
  CPC .............. *F16B 45/04* (2013.01); *A45C 13/30* (2013.01); *A45F 5/02* (2013.01); *A45F 2200/0558* (2013.01)

(58) Field of Classification Search
  CPC .. F16B 45/04; A45C 13/30; A45F 5/02; A45F 2200/0558

(Continued)

(56) References Cited

U.S. PATENT DOCUMENTS 275,537 A    4/1883   Straw
647,714 A    4/1900   Baker
(Continued)

FOREIGN PATENT DOCUMENTS

CA    2814922 A1    11/2014
JP    2012229806 A1    11/2012

OTHER PUBLICATIONS

Notification of Transmittal of the International Search Report and Written Opinion of the International Searching Authority, or the Declaration from the International Bureau of WIPO for International Application No. PCT/US2016/013250, dated Apr. 21, 2016, pp. 1-16.

*Primary Examiner* — Robert Sandy
*Assistant Examiner* — Louis A Mercado
(74) *Attorney, Agent, or Firm* — Nancy R. Gamburd; Gamburd Law Group LLC

(57) ABSTRACT

A multi-glide locking snap hook fastener is disclosed which includes a fastener body and a gate closure. The body includes a curved hook and a base, with the base including a longitudinal bore and a multipart channel extending radially into the bore. The multipart channel includes a first channel segment extending along or across a first part of the base, and a second channel segment extending along or across a second part of the base, with the second channel segment offset at a first angle from the first channel segment. The gate closure is arranged within the bore and includes an elongated shaft and a grip extending from the elongated shaft and into the multipart channel, with the gate moveable both longitudinally and rotatably within the bore. Several different closed configurations are provided, requiring several different and distinct movements to fully open the fastener.

46 Claims, 12 Drawing Sheets

(58) Field of Classification Search
USPC ............ 24/600.4, 600.5, 600.7, 600.8, 601.6
See application file for complete search history.

(56) References Cited

U.S. PATENT DOCUMENTS

| | | |
|---|---|---|
| 5,127,137 A | 7/1992 | Krauss |
| 5,257,441 A | 11/1993 | Barlow |
| 5,361,464 A | 11/1994 | Bunnell |
| 5,579,564 A | 12/1996 | Rullo et al. |
| 5,915,631 A | 6/1999 | Laxton et al. |
| 6,070,308 A | 6/2000 | Rohlf |
| 7,472,461 B2 | 1/2009 | Anstee |
| 7,526,843 B2 | 5/2009 | Lin |
| 8,015,676 B1 | 9/2011 | Choate |
| 8,234,758 B2 | 8/2012 | Liu |
| 8,276,247 B2 | 10/2012 | Yang |
| 8,365,365 B2 | 2/2013 | Schlipper |
| 8,590,120 B2 | 11/2013 | Sakai |
| 8,752,254 B2 | 6/2014 | Perner |
| 2014/0325805 A1 | 11/2014 | Troiano |

MULTI-GLIDE LOCKING SNAP HOOK FASTENER

CROSS-REFERENCE TO A RELATED APPLICATION

This application is a nonprovisional of and claims priority to and the benefit of U.S. Provisional Patent Application No. 62/104,717, filed Jan. 17, 2015, inventors Slobodan S. Zivanovic et al., titled "Multi-Glide Locking Snap Hook Fastener", which is commonly assigned herewith, the entire contents of which are incorporated herein by reference with the same full force and effect as if set forth in its entirety herein, and with priority claimed for all commonly disclosed subject matter.

FIELD OF THE INVENTION

The present invention generally relates to a hook fastener for connecting a belt or strap to another object such as a purse or bag, and more particularly, relates to a locking snap hook fastener having a multipart channel requiring a plurality of corresponding movements for unlocking and opening the locking snap hook fastener.

BACKGROUND OF THE INVENTION

A wide variety of locking snap hook fasteners are available. Many of these fasteners, however, are overly-complicated, with many additional parts required and further requiring additional assembly, including the use of separate and additional locking pins or locking collars to prevent inadvertent or undesired opening of the snap hook fastener.

For example, U.S. Pat. No. 8,365,365 provides for a collar piece, referred to as a "keeper", to prevent movement of a cylindrical closing member. A rotation of the collar piece is required to align a slot with the grip of the closing member, to allow the retraction of the closing member and opening of the snap lock.

Similarly, U.S. Pat. No. 7,472,461 provides for a complicated mechanism with many additional parts, such as a moveable sleeve and a pin mounted in a transverse bore with a second, additional bias spring, which is then seated in a recess when the closure shaft is closed, locking the closure shaft into the closed position, with additional button-type components required to release the locking pin.

Accordingly, a need remains for a fastener which may be readily implemented, without requiring additional parts or complicated manufacturing. Such a fastener should nonetheless require multiple, distinct and different movements to open the fastener, to avoid inadvertent or easy opening of the fastener, and thereby provide additional locking security.

SUMMARY OF THE INVENTION

The exemplary embodiments provide a fastener, variously referred to as a multi-glide locking snap hook fastener (or a locking snap hook or merely as a fastener), having a multipart channel. The exemplary embodiments provide for increased security of a fastener, requiring several different and distinct movements to open the exemplary or representative multi-glide locking snap hook fastener, without requiring a separate locking pin or collar arrangement. This also serves to decrease the concerns of a traveler or commuter, for example, knowing that a would-be pickpocket or other thief cannot quickly and surreptitiously undo and open the fastener, such as to quickly steal a purse, briefcase, shoulder bag or other carrying bag. The exemplary or representative multi-glide locking snap hook fastener may also be implemented aesthetically, with designs which do not look or feel utilitarian but which nonetheless have superior attachment and security functionality.

An exemplary or representative embodiment provides a fastener, comprising: a body comprising a curved hook and a base, the base comprising a longitudinal bore and a multipart channel extending radially into the bore; the multipart channel comprising: a first channel segment extending along or across a first part of the base; a second channel segment extending along or across a second part of the base, the second channel segment contiguous and communicating with the first channel segment, and the second channel segment offset at a first angle from the first channel segment; and a third channel segment extending along or across a third part of the base, the third channel segment contiguous and communicating with the second channel segment, and the third channel segment offset at a second angle from the second channel segment; and a gate arranged within the bore, the gate comprising an elongated shaft and a grip extending from the elongated shaft and into the multipart channel, the gate moveable both longitudinally and rotatably within the bore.

In such an embodiment, when the gate is in a first position with the grip arranged within the first channel segment, the fastener has a first closed configuration; when the gate is in a second position with the grip arranged within the second channel segment, the fastener has a second closed configuration; and when the gate is in a third position with the grip arranged within the third channel segment, the fastener has an open configuration.

In an exemplary or representative embodiment, the multipart channel may further comprise: a fourth channel segment extending along or across a fourth part of the base, the fourth channel segment offset at a third angle from the first channel segment, the fourth channel segment contiguous and communicating with the first channel segment, and when the gate is in a fourth position with the grip arranged within the fourth channel segment, the fastener has a locked first closed position. In another exemplary or representative embodiment, the multipart channel may further comprise: a fifth channel segment extending along or across a fifth part of the base, the fifth channel segment offset at a fourth angle from the third channel segment, the fifth channel segment contiguous and communicating with the third channel segment, and when the gate is in a fifth position with the grip arranged within the fifth channel segment, the fastener has a locked open position.

In an exemplary or representative embodiment, the first and second offset angles are substantially right angles to provide that the first channel segment and the third channel segment are substantially orthogonal to the second channel segment. In another exemplary or representative embodiment, the first and second offset angles are each an acute angle or an obtuse angle to provide that the multipart channel has a zig-zag configuration.

In an exemplary or representative embodiment, the grip may further comprise: a neck coupled to the elongated shaft and arranged and moveable within the multipart channel; and a head extending from the neck to an exterior of the base for user manipulation, wherein the head has a shape selected from the group consisting of: button-shaped, pear-shaped, triangular, rectangular, spherical, tab-shaped, bulb or bulbous-shaped, teardrop-shaped, and combinations thereof.

In an exemplary or representative embodiment, the hook may further comprise a mating recess for receiving a first end of the gate for a first closed configuration of the fastener. Also in an exemplary or representative embodiment, the first channel segment has a predetermined length in a longitudinal dimension equal to or less than a combined length of a depth of the mating recess and a predetermined variance, and wherein the second channel segment is arranged the predetermined distance plus an offset distance from a first end of the base.

In another exemplary or representative embodiment, the fastener may further comprise: a bias spring arranged within the bore adjacent to the gate; a coupling ring; and wherein the body further comprises: an integrally-formed body shaft rotatably coupled to the coupling ring. In such an embodiment, the bore may be angularly offset from the body shaft and the axis of rotation of the body shaft relative to the coupling ring; the base may be substantially frustoconical and tapers in diameter from a second end to a first end; and the hook may extend in a C-shape curve from a lower half of the base at the second end of the base and the hook tapers in width.

Another exemplary or representative embodiment provides a fastener, comprising: a body comprising a curved hook and a base, the base comprising a longitudinal bore; the base further comprising a multipart channel extending radially into the bore and comprising: a first channel segment extending along or across a first part of the base; and at least one second channel segment extending along or across at least one second part of the base, the at least one second channel segment offset at a first angle from the first channel segment; and a gate arranged within the bore, the elongated gate comprising an elongated shaft and a grip extending from the elongated shaft and into the multipart channel, the gate moveable both longitudinally and rotatably within the bore.

In such an embodiment, when the gate is in a first position with the grip arranged within the first channel segment, the fastener has a first closed configuration, and when the gate is in a second position with the grip arranged within the at least one second channel segment, the fastener has an open configuration.

In an exemplary or representative embodiment, the at least one second channel segment is contiguous and communicating with the first channel segment.

In another exemplary or representative embodiment, the multipart channel may further comprise: a third channel segment extending along or across a third part of the base, the third channel segment offset at a second angle from the at least one second channel segment. In such an embodiment, when the gate is in a first position with the grip arranged within the first channel segment, the fastener has a first closed configuration, when the gate is in a second position with the grip arranged within the at least one second channel segment, the fastener has a second closed configuration, and when the gate is in a third position with the grip arranged within the third channel segment, the fastener has an open configuration. In such an embodiment, the third channel segment is contiguous and communicating with the at least one second channel segment and the at least one second channel segment is contiguous and communicating with the first channel segment.

In another exemplary or representative embodiment, the multipart channel may further comprise: a fourth channel segment extending along or across a fourth part of the base, the fourth channel segment offset at a third angle from the first channel segment, the fourth channel segment contiguous and communicating with the first channel segment, and when the gate is in a fourth position with the grip arranged within the fourth channel segment, the fastener has a locked first closed position.

In yet another exemplary or representative embodiment, the multipart channel may further comprise: a fifth channel segment extending along or across a fifth part of the base, the fifth channel segment offset at a fourth angle from the third channel segment, the fifth channel segment contiguous and communicating with the third channel segment, and when the gate is in a fifth position with the grip arranged within the fifth channel segment, the fastener has a locked open position.

Another exemplary or representative embodiment provides a fastener, comprising: a coupling ring; a body comprising a base, a curved hook integrally-formed with the base, and a body shaft integrally-formed with the base, the base comprising a longitudinal bore and a multipart channel extending radially into the bore, the body rotatably coupled through the body shaft to the coupling ring; a bias spring arranged within the bore; the multipart channel comprising: a first channel segment extending along or across a first part of the base; a second channel segment extending along or across a second part of the base, the second channel segment contiguous and communicating with the first channel segment, and the second channel segment offset at a first angle from the first channel segment; and a third channel segment extending along or across a third part of the base, the third channel segment contiguous and communicating with the second channel segment, and the third channel segment offset at a second angle from the second channel segment; and a gate arranged within the bore and adjacent the bias spring, the gate moveable both longitudinally and rotatably within the bore, the gate comprising a cylindrical shaft and a grip extending from the cylindrical shaft; the grip comprising: a neck coupled to the cylindrical shaft and arranged and moveable within the multipart channel; and a head extending from the neck to an exterior of the base for user manipulation.

Another exemplary or representative embodiment provides a fastener, comprising: a coupling ring; a body rotatably coupled to the coupling ring, the body having a base and a curved hook extending from the base to form an interior region, the base having a substantially cylindrical bore extending longitudinally through the base, the hook having an end comprising a mating recess; a bias spring arranged within the bore; a multipart channel extending radially from an exterior surface of the base into the bore and comprising a first channel segment, a second channel segment contiguous and communicating with the first channel segment, and a third channel segment contiguous and communicating with the second channel segment, the first channel segment extending longitudinally along a first part of the base, the second channel segment extending transversely across a second part of the base, and the third channel segment extending longitudinally along a third part of the base and offset longitudinally and transversely from the first part of the base; and a gate arranged within the bore and adjacent to the bias spring, the gate further comprising a substantially cylindrical shaft and a grip extending from the cylindrical shaft into the multipart channel, the gate moveable longitudinally and rotatably within the bore into a plurality of gate positions, a first gate position when the grip is arranged in the first channel segment providing a first closed configuration in which a first end of the cylindrical gate is inserted into the mating recess of the hook, a second gate position when the grip is arranged in the second channel segment providing second closed configuration in which the first end of the cylindrical gate abuts the end of the hook, and a third gate position when the grip is arranged in the third channel segment providing an open configuration when the grip is retracted along the third channel segment.

An exemplary or representative embodiment provides a locking snap hook fastener, comprising: a coupling ring; a body having a curved hook, a base, and a body shaft, the base having a bore extending longitudinally, the body rotatably coupled through a body shaft to the coupling ring; a bias spring arranged within the bore; a multipart channel extending radially from an exterior surface of the base into the bore and comprising a first channel segment, a second channel segment contiguous and communicating with the first channel segment, and a third channel segment contiguous and communicating with the second channel segment, the first channel segment extending longitudinally along the base, the second channel segment extending transversely across the base, and the third channel segment extending longitudinally along the base; and a cylindrical gate arranged within the bore and coupled to the bias spring, the cylindrical gate further comprising a shaft and a grip extending from the shaft into the multipart channel, the cylindrical gate moveable longitudinally and rotatably within the bore between an open configuration when the grip is retracted along the third channel segment and a first closed configuration coupling a first end of the cylindrical gate to the hook of the body when the grip is arranged in the first channel segment.

In an exemplary or representative embodiment, the grip may further comprise: a neck arranged and moveable within the multipart channel; and a head extending from the neck to an exterior of the base for user manipulation. For example, the head may be teardrop-shaped.

In another exemplary or representative embodiment of the locking snap hook fastener, the hook may further comprise a mating recess for receiving the first end of the cylindrical gate in the first closed configuration. In an exemplary or representative embodiment, the first channel segment has a predetermined length proportional to a depth of the mating recess. In another exemplary or representative embodiment, the second channel segment is arranged a predetermined distance from a first end of the bore, the predetermined distance proportional to the depth of the mating recess.

In an exemplary or representative embodiment, the cylindrical gate is further moveable into a second closed configuration when the grip is arranged along the second channel segment, the second closed configuration comprising the first end of the cylindrical gate abutting an end of the hook of the body.

In another exemplary or representative embodiment, the locking snap hook fastener may further comprise a fourth channel segment of the plurality of contiguous and communicating channel segments, the third channel segment coupled to the first channel segment or to the second channel segment, the third channel segment extending longitudinally or transversely, or both longitudinally and transversely.

In another exemplary or representative embodiment, a locking snap hook fastener is disclosed which comprises: a coupling ring; a body rotatably coupled to the coupling ring, the body having a base and a curved hook extending from the base to form an interior region, the base having a substantially cylindrical bore extending longitudinally through the base, the hook having a recess at an end of the hook; a bias spring arranged within the bore; a multipart channel extending radially from an exterior surface of the base into the bore and comprising a first channel segment, a second channel segment contiguous and communicating with the first channel segment, and a third channel segment contiguous and communicating with the second channel segment, the first channel segment extending longitudinally along a first part of the base, the second channel segment extending transversely across a second part of the base, and the third channel segment extending longitudinally along a third part of the base and offset longitudinally and transversely from the first part of the base; and a gate arranged within the bore and coupled to the bias spring, the gate further comprising a substantially cylindrical shaft and a grip extending from the shaft into the multipart channel, the gate moveable longitudinally and rotatably within the bore between an open configuration when the grip is retracted along the third channel segment, a first closed configuration coupling a first end of the cylindrical gate into recess of the hook when the grip is arranged in the first channel segment, and a second closed configuration coupling the first end of the cylindrical gate to abut the end of the hook when the grip is arranged in the second channel segment.

In another exemplary or representative embodiment, a locking snap hook fastener is disclosed which comprises: a body comprising a curved hook and a base, the base having a bore extending longitudinally through the base; a multipart channel extending radially into the bore and comprising a plurality of contiguous and communicating channel segments, a first channel segment of the plurality of contiguous and communicating channel segments extending longitudinally or transversely, or both longitudinally and transversely along or across at least a first part of the base, and a second channel segment of the plurality of contiguous and communicating channel segments respectively extending transversely or longitudinally, or both transversely and longitudinally, across at least a second part of the base; and an elongated gate member arranged within the bore, the elongated gate member comprising a shaft and a grip extending from the shaft into the multipart channel, the elongated gate member moveable longitudinally and rotatably within the bore between an open configuration when the grip is retracted along the second channel segment and a first closed configuration coupling a first end of the cylindrical gate to the hook when the grip is arranged in the first channel segment.

In another exemplary or representative embodiment of a locking snap hook fastener, the first channel segment may be substantially orthogonal to the second channel segment. In yet another exemplary or representative embodiment of a locking snap hook, the first channel segment may be at an acute or obtuse angle to the second channel segment to form at least a partial zig-zag configuration.

In another exemplary or representative embodiment, a locking snap hook fastener may further comprise a third channel segment of the plurality of contiguous channel segments, the third channel segment coupled between the first channel segment and the second channel segment, the third channel segment extending longitudinally or transversely, or both longitudinally and transversely, along at least a third part of the base. In such an embodiment, the elongated gate member is further moveable into a second closed configuration when the grip is arranged within the third channel segment, the second closed configuration comprising the first end of the cylindrical gate abutting an end of the hook of the body.

In another exemplary or representative embodiment, a locking snap hook fastener may further comprise a fourth channel segment of the plurality of contiguous and communicating channel segments, the fourth channel segment coupled to the first channel segment, wherein the elongated gate member is further moveable into a locked first closed configuration when the grip is arranged within the fourth channel segment.

In another exemplary or representative embodiment, a locking snap hook fastener may further comprise a fifth channel segment of the plurality of contiguous and communicating channel segments, the fifth channel segment coupled to the second channel segment, wherein the elongated gate member is further moveable into a locked open configuration when the grip is arranged within the fifth channel segment.

In yet another exemplary or representative embodiment of a locking snap hook fastener, the first channel segment and the third channel segment may be substantially orthogonal to the second channel segment. In yet another exemplary or representative embodiment of a locking snap hook, the first channel segment and the third channel segment are each at an acute or obtuse angle to the second channel segment to form a zig-zag configuration.

In another exemplary or representative embodiment, a locking snap hook fastener may further comprise a coupling ring; wherein the body further comprises a body shaft rotatably coupled to the coupling ring. In an exemplary or representative embodiment, the bore is angularly offset from the body shaft and the axis of rotation of the body shaft within and relative to the coupling ring.

In another exemplary or representative embodiment, the base is substantially frustoconical and tapers in diameter from a second end to a first end and wherein the hook extends in a C-shape curve from a lower half of the base at the second end of the base. In an exemplary or representative embodiment, the base tapers in diameter from about 30% to about 50% from the second end to the first end and the hook tapers in width from about 50% to about 75%.

Numerous other advantages and features of the present disclosure will become readily apparent from the following detailed description of the subject matter described in this specification and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters and/or numeric subscripts are utilized to identify parts or subparts of a component or additional types, instantiations or variations of a selected component embodiment in the various views, as further indicated by textual context, in which.

DETAILED DESCRIPTION OF REPRESENTATIVE EMBODIMENTS

Figure 1:
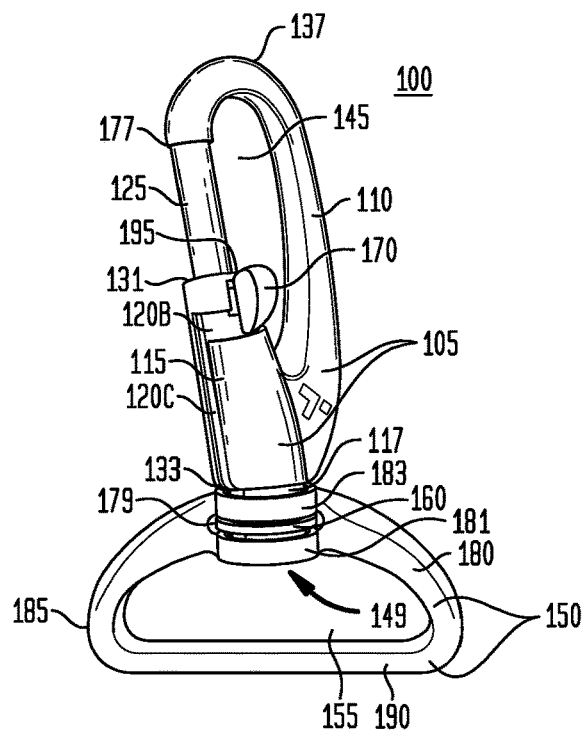
FIG. 1 is a first diagram illustrating an isometric front view of an exemplary or representative multi-glide locking snap hook fastener embodiment in a first closed configuration.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
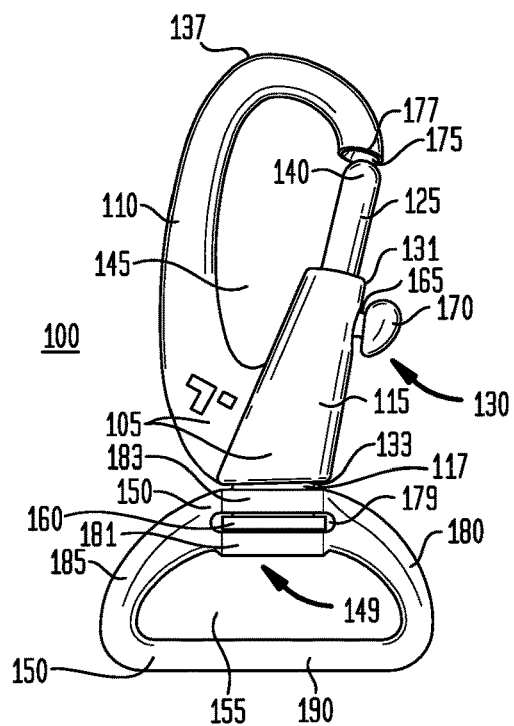
FIG. 2 is a diagram illustrating a first side view of an exemplary or representative multi-glide locking snap hook fastener embodiment in a second closed configuration.
Figure 3:
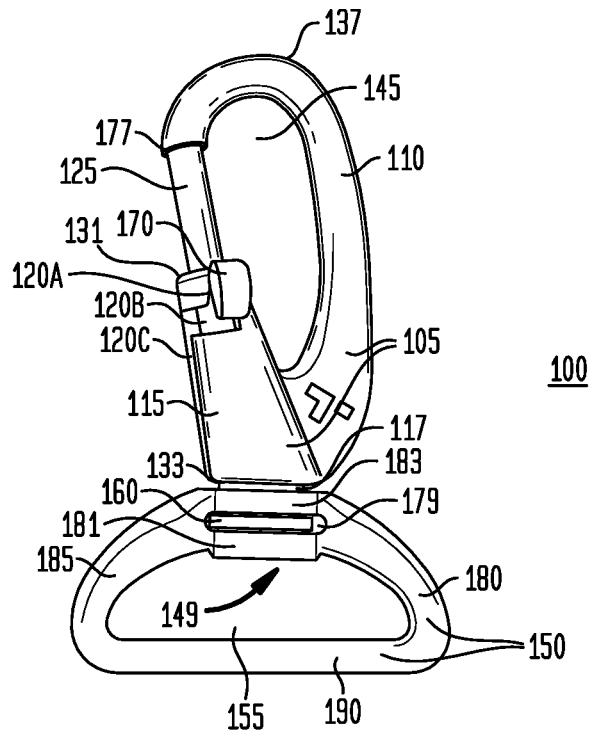
FIG. 3 is a diagram illustrating a second side view of an exemplary or representative multi-glide locking snap hook fastener embodiment in the first closed configuration.
Figure 4:
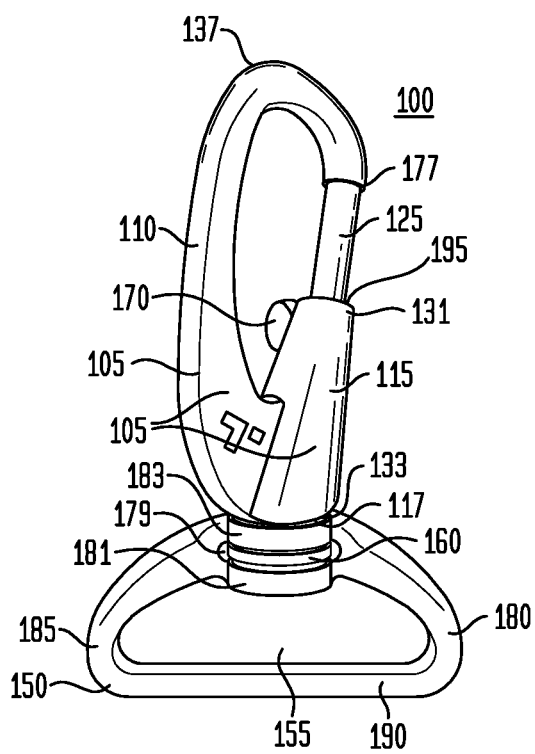
FIG. 4 is a diagram illustrating an isometric rear or back view of an exemplary or representative multi-glide locking snap hook fastener embodiment in the first closed configuration.
Figure 5:
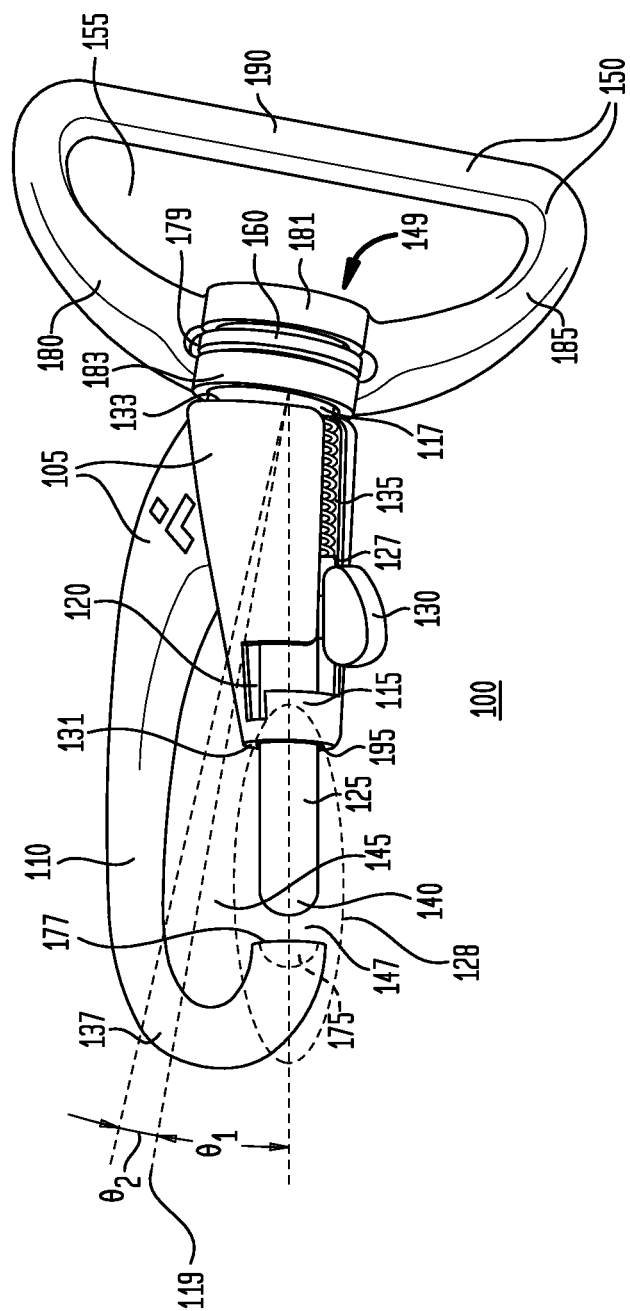
FIG. 5 is a diagram illustrating an isometric view of an exemplary or representative multi-glide locking snap hook fastener embodiment in a partially open configuration.
Figure 6:
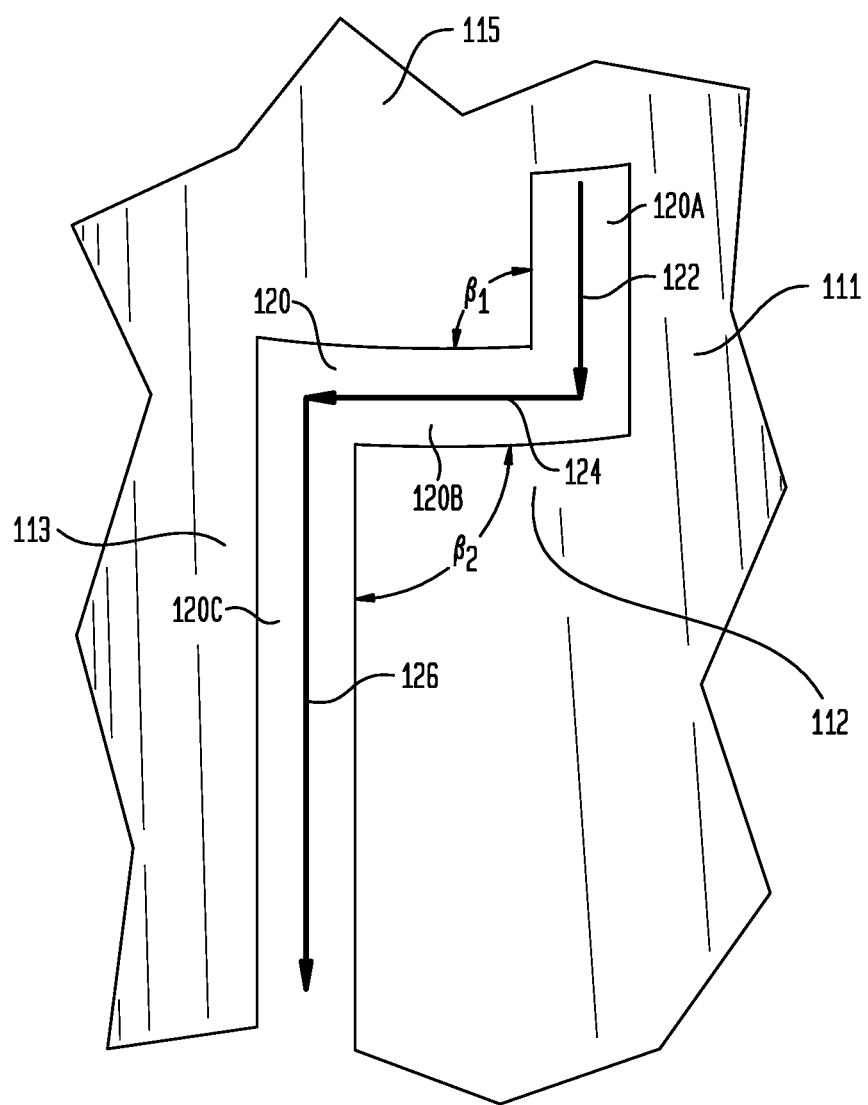
FIG. 6 is a diagram of an exemplary or representative multipart channel (illustrated in a section of the base) having a first configuration and illustrating a plurality of corresponding gate movements for unlocking and opening an exemplary or representative multi-glide locking snap hook fastener embodiment having the first configuration of a multipart channel.

FIG. 1 is a first diagram illustrating an isometric view of an exemplary or representative multi-glide locking snap hook fastener 100 embodiment in a first closed configuration. FIG. 2 is a diagram illustrating a first side view of an exemplary or representative multi-glide locking snap hook fastener 100 embodiment in a second closed configuration. FIG. 3 is a diagram illustrating a second side view of an exemplary or representative multi-glide locking snap hook fastener 100 embodiment in the first closed configuration. FIG. 4 is a diagram illustrating a rear view of an exemplary or representative multi-glide locking snap hook fastener 100 embodiment in the first closed configuration. FIG. 5 is a diagram illustrating an isometric view of an exemplary or representative multi-glide locking snap hook fastener embodiment 100 in a partially open configuration. FIG. 6 is a diagram of an exemplary or representative multipart channel 120 illustrating a plurality of corresponding gate movements for unlocking and opening an exemplary or representative multi-glide locking snap hook fastener embodiment 100 having the first configuration of a multipart channel 120.

Referring to FIGS. 1-6, the exemplary or representative multi-glide locking snap hook fastener 100 comprises a body (or equivalently a body portion) 105 and an elongated, generally cylindrical gate or closure member 125, referred to as a gate 125. A gate 125 may also be referred to equivalently as a closure, a rod, etc., and is described in greater detail below. The body 105 further comprises a hook (or equivalently a hook portion) 110 and a base (or equivalently a base portion) 115, and the gate 125 is disposed or arranged within a generally or typically cylindrical bore 195 of the base 115 (the bore 195 is also illustrated in FIGS. 15-18 without the presence of a gate 125). In a representative embodiment, the base 115 is generally conically or frusto-conically-shaped as illustrated in FIGS. 1-4 and 9-12, with a first end 131 having a face oriented in a plane transverse to the base 115, and with a second end 133 having a face oriented obliquely to the base 115, tapering in diameter from about 30% to about 50% from the second end 133 (considered to be 100%) to the first end 131 (30% to about 50% of the diameter of the second end 133), as illustrated. Those having skill in the art will recognize that the base 115 may have innumerable other shapes, for any selected design, any and all of which are considered equivalent and within the scope of the disclosure, with the base 115 merely required to have sufficient size to allow or provide for a bore 195 for holding a gate 125 (and a bias spring 135 discussed below).

The hook (or hook portion) 110 is typically integrally formed with the base 115, is generally C-shaped and extends from the lower half of the base 115 (at the second end 133), curving to an apex 137 and further curving to a terminus or end 177 as illustrated, to define an interior region 145 (opening or gap) for fastening to an object such as an attachment ring of a purse, briefcase, suitcase, or other carrying bag (illustrated and discussed below with reference to FIG. 20). The hook 110 has a generally constant thickness or slightly tapering thickness, with a more significant tapering of its width from about 50% to about 75%, also as illustrated (in which 100% of the width is determined where the hook 110 joins the base 115). Also, while illustrated as having substantially rounded edges, those having skill in the art will recognize that innumerable other designs are available, are substantially equivalent and within the scope of the disclosure.

For ease of reference, directions and orientations utilized herein are with reference to the lengthwise axis of the bore 195 in the base 115, as the longitudinal dimension, with the radial dimension extending radially and orthogonally from the lengthwise axis of the bore 195 in the base 115, and with the transverse dimension extending orthogonally to both the longitudinal dimension and the radial dimension, e.g., across the width of the base 115, as will be apparent to those having skill in the art from the following disclosure, for example, the transverse dimension being east or west to a north-south longitudinal dimension.

The base 115 has a generally cylindrical bore (or opening) 195 extending longitudinally within the base 115, the full length of the base 115, to receive the generally cylindrically-shaped gate 125 and a bias spring 135 (generally a helical coil spring) mounted or coupled within the bore 195, and further having a multipart channel 120 (or, equivalently, a multi-segmented channel 120). The multipart channel 120 is an opening (equivalently a slot, cavity, groove, or gap) through the thickness of the base 115 extending into the bore 195, i.e., open in the radial dimension from the exterior face of the base 115, through the wall or thickness of base 115 and into the interior of the cylindrical bore 195 of the base 115, and further extending both longitudinally and transversely in the base 115, as illustrated. The gate 125 is slideable or otherwise moveable longitudinally within the bore 195 (a reciprocating movement), and further is at least partially rotatable within the bore 195, as discussed in greater detail below, for movement of the gate 125 into multiple positions or orientations, to provide for the multi-glide locking snap hook fastener 100 to have corresponding open configurations (or positions) and closed configurations (or positions), as described in greater detail below. (It should be noted that in addition to a cylindrical shape having a generally circular cross section, it is possible for the gate 125 and bore 195 to have any of other myriad different shapes, which may be different from the other, such as (in cross section) square, rectangular, elliptical, hexagonal, octagonal, etc., provided, however, that the gate 125 should be reciprocally moveable (longitudinally) through at least a portion of the length of the bore 195 of the base 115 and at least partially rotatable (with a longitudinal axis of rotation) within the bore 195, as discussed below.)

As discussed in greater detail below, the multipart channel 120, in a first configuration, arrangement or embodiment, comprises at least two and more typically three contiguous and communicating (or connected) segments, portions or parts. As illustrated in FIGS. 1-6, 9-14, 19 and 20, the multipart channel 120 has three contiguous and communicating (or connected) segments, portions or parts, a first longitudinal part referred to as a first channel segment 120A, a second transverse part referred to as a second channel segment 120B, and a third longitudinal part referred to as a third channel segment 120C, collectively forming the multipart channel 120. Other embodiments of a multipart channel 120 having different arrangements, configurations and/or orientations of a first channel segment 120A, a second channel segment 120B, possibly a third channel segment 120C, and additional channel segments, are discussed below with reference to FIGS. 15-18, and any and all of such multipart (or otherwise multi-segmented) channels 120 are within the scope of the disclosure. "Multi-glide" then refers to the movement of the gate 125 (and more particularly, the neck 165 of the grip 130 or the grip 130A) along the multiple segments or parts of the multipart channel 120, providing various open and closed configurations of the exemplary or representative multi-glide locking snap hook fastener 100, and not merely the singular up-down movement of a closure member in typical prior art snap hook fasteners, such as found on a dog leash, for example and without limitation.

Figure 20:
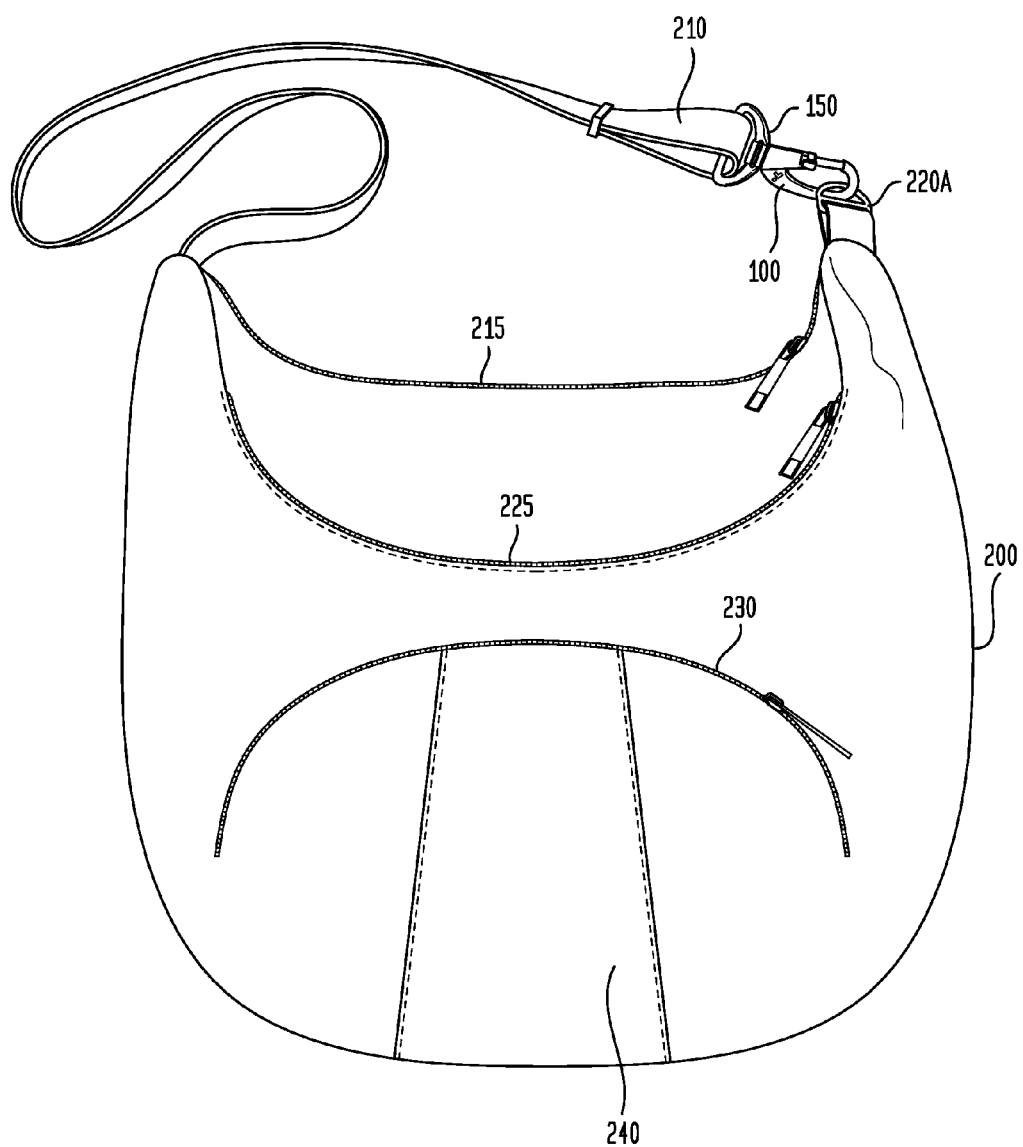
FIG. 20 is a diagram illustrating an isometric view of an exemplary or representative multi-glide locking snap hook fastener embodiment coupled to a carrying strap and coupled to an attachment ring of a carrying bag such as a purse, briefcase, suitcase, or other bag.

The body 105 further has a swivel attachment, i.e., is rotatably coupled, to a coupling ring 150, such as for attachment to a carrying strap 210 (as illustrated in FIG. 20) of a briefcase, purse, suitcase, or other carrying bag 200, typically coupled through opening 155 and around a transverse arm 190 of the coupling ring 150 as known in the mechanical arts. As illustrated, the coupling ring 150 is D-shaped and comprises the transverse arm 190 joined or coupled to two arcuate arms 180, 185, which are coupled to each other and further comprise spaced-apart flanges 181, 183 and an opening 179 to receive a shaft 117 of the body 105, also referred to as a "body shaft" 117 to distinguish it from the typically cylindrical shaft 142 of the gate 125. The body shaft 117 typically includes a radial recess (not separately illustrated) extending transversely at least partially around the circumference of the body shaft 117 for coupling with the clip 160 between the spaced-apart flanges 181, 183 to secure the body 105 to the coupling ring 150 while allowing complete, 360 degrees of rotation or swiveling of the body 105 relative to the coupling ring 150. The coupling ring 150 also generally includes a flat, transverse base 149 integral with flange 181, which secures the bias spring 135 against a second end 127 of the gate 125. To assemble the exemplary or representative multi-glide locking snap hook fastener 100, the gate 125 and bias spring 135 are inserted into the bore 195 of the base 115 at the second end 133, followed by inserting a bias spring 135 and attaching the coupling ring 150 (e.g., by inserting the body shaft 117 into the opening 179 in the coupling ring 150 and attaching C-shaped clip 160 between the flanges 181, 183) and, once the coupling ring 150 is attached, nothing further needs to be mounted or attached to the exemplary or representative multi-glide locking snap hook fastener 100. Those having skill in the art will recognize innumerable swiveling and/or rotatable structures and methods for securing a body 105 of a hook fastener to a coupling ring 150, and all such mechanisms and methods are considered equivalent and within the scope of the present disclosure.

It should be noted that each of the body 105 and the coupling ring 150 of the exemplary or representative multi-glide locking snap hook fastener 100 may be fabricated, such as machined, molded, printed, stamped, etc., from a wide variety of materials as known or becomes known in the mechanical arts, including coated or uncoated metals or metallic alloys such as aluminum, steel, titanium, carbon steel, nickel, copper, gold, silver, tin, and so on, or any of a variety of compounds such as plastics, polymers or polymeric precursors such as nylon, resins, acrylates, with or without other embedded components such as carbon fibers, graphene, etc., for example and without limitation. In addition, the overall size of the exemplary or representative multi-glide locking snap hook fastener 100, or any of its components, is typically determined based on its application and anticipated stress or weight load, and width of a carrying strap, such as for a light purse compared to a heavy suitcase (as types of carrying bags 200), also for example and without limitation. It should also be noted that the various Figures also illustrate a "T" logo positioned on the hook 110, as an example of indicia which may be included as an option, and those having skill in the art will recognize that inclusion of any such logo or other indicia is optional and is not any type of limitation of the present disclosure.

As illustrated in FIG. 5, the body 105 has an axis of rotation (illustrated as line 119 in FIG. 5) with respect to the coupling ring 150. In the exemplary or representative embodiment illustrated, the base 115 and gate 125 are angularly offset in a first direction (illustrated as angle $\theta_1$) from this axis of rotation (119), and the apex 137 is angularly offset in a second, opposite direction (illustrated as angle $\theta_2$) from the body shaft 117 of the body 105 and the axis of rotation (119) of the body shaft 117 relative to the coupling ring 150. It should be noted that such an angular offset is generally for aesthetic reasons only, and any and all alignments and offsets are within the scope of the present disclosure. In an exemplary or representative embodiment illustrated, the longitudinal axis of the gate 125 is between about 10 degrees to 20 degrees offset, and more specifically between about 14 degrees to 16 degrees offset, in a first direction from the axis of rotation (119) of the body shaft 117 relative to the coupling ring 150, and the apex 137 of the hook 110 is between about 1.0 degrees to 5.0 degrees, and more specifically about 3.0 degrees, offset in a second, opposite direction from the axis of rotation (119) of the body shaft 117 relative to the coupling ring 150.

Figure 13:
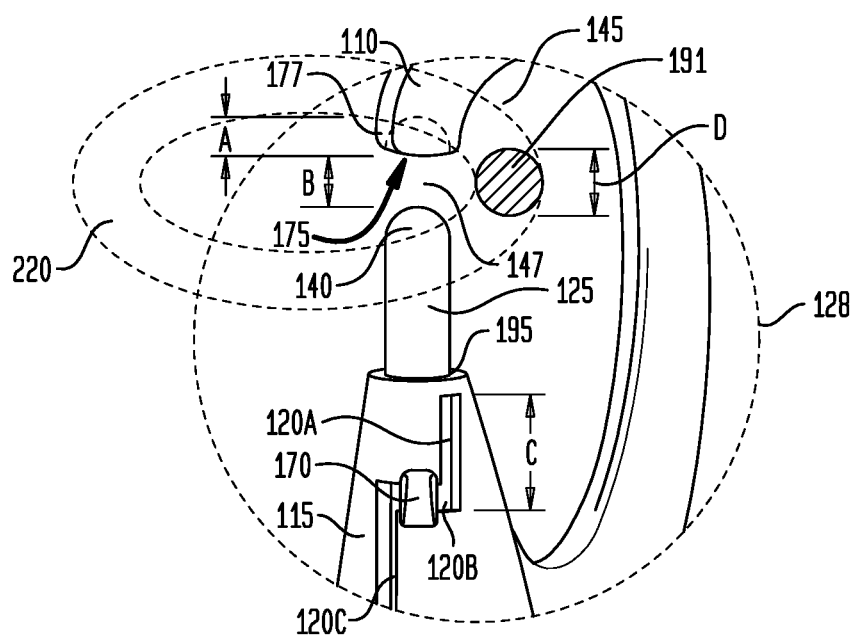
FIG. 13 is a diagram illustrating a side view detail from FIG. 5 of a portion of a gate, a grip, a base, a hook, and their relative dimensions of an exemplary or representative multi-glide locking snap hook fastener embodiment in an alternative second closed configuration.

In a first closed configuration or position of the multi-glide locking snap hook fastener 100, the first end 140 of the gate 125 is typically abutting and inserted into a corresponding or mating recess 175 at the end 177 of the hook 110, illustrated as a hemispherical or cup-shaped recess for mating with the illustrated curved (hemispherical) or dome-shaped first end 140 of the gate 125, (using dashed lines in FIG. 5 to indicate that the recess 175 is within the interior of the hook 110 and also illustrated in greater detail in FIG. 13). Other shapes or configurations of the first end 140 of the gate 125 are also illustrated in the various Figures, such as flat or flat with partially curved edges, typically with a corresponding or mating shape of a recess 175 (e.g., cylindrical), and any such shapes are considered equivalent and within the scope of the present disclosure. Within the bore 195, the gate 125 is typically biased, forced or urged by the bias spring 135 (illustrated as a helical coil spring), into one or more closed configurations or positions, with the first end 140 of the gate 125 both abutting and inserted into (nested within) the corresponding or mating recess 175 of the hook 110, as a first closed configuration or position, or abutting the end 177 without being inserted into the corresponding or mating recess 175 of the hook 110 (as second closed configuration or position). Other types of springs or bias mechanisms (such as a leaf spring) may be utilized equivalently, as known or may become known in the mechanical arts. An additional variation of a second closed configuration or position is discussed in greater detail below. When the gate 125 is at least partially or fully retracted into the bore 195 and the bias spring 135 is compressed, an opening (or gap) 147 into and communicating with the interior region 145 is created for the multi-glide locking snap hook fastener 100, for inserting and coupling to an object, or for removing and uncoupling from an object, such as for fastening to or unfastening from an object such as an attachment ring 220 or loop (which is then held within or removed from the interior 145 of the multi-glide locking snap hook fastener 100) of a briefcase, purse, suitcase, or other carrying bag 200, typically for attaching a carry strap 210 (coupled to the coupling ring 150) to such attachment ring 220 or loop of a carrying bag 200, as illustrated in FIG. 20.

Figure 7:
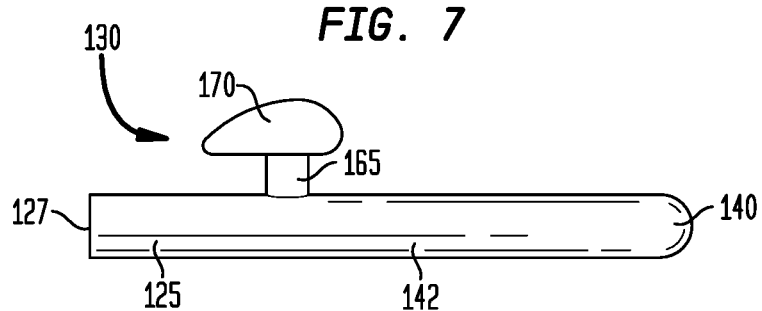
FIG. 7 is a diagram illustrating a side view of an exemplary or representative first embodiment of a gate of an exemplary or representative multi-glide locking snap hook fastener embodiment.

FIG. 7 is a diagram illustrating a side view of an exemplary or representative first embodiment of a gate 125 of an exemplary or representative multi-glide locking snap hook fastener 100 embodiment. As illustrated, a gate 125 comprises a generally cylindrical shaft (or rod) 142 and a grip 130, typically for grasping by a user's thumb (while holding the exemplary or representative multi-glide locking snap hook fastener 100) to manually manipulate the gate 125 into or between various positions which create open, closed, and partially open or closed configurations of the multi-glide locking snap hook fastener 100, such as a fully open configuration or position (gate 125 fully or mostly retracted into the bore 195), various closed configurations or positions (gate 125 abutting or abutting and inserted or extended into the mating recess 175 of the hook 110), and various partially open/closed positions discussed below. In the gate 125 embodiment illustrated in FIG. 7, the grip 130 further comprises a neck (or neck portion) 165 coupled to a head (or head portion) 170, with the neck 165 disposed or arranged (and sized correspondingly) for movement within and along the multipart channel 120, and with the head 170 disposed or arranged on the exterior of the base 115 and exposed for grasping and manipulation by the user, as illustrated in FIGS. 1-5 and 9-12. In an exemplary or representative embodiment, the head 170 may have any of a plurality of shapes or sizes, symmetric or asymmetric, such as button-shaped, pear-shaped, triangular, rectangular, spherical, tab-shaped, bulb or bulbous-shaped or, as illustrated, teardrop-shaped, i.e., any shape for a user to grasp and/or slide with a user's thumb or fingers, for example and without limitation. In an exemplary or representative embodiment, the neck 165 also may have any of a plurality of shapes or sizes, symmetric or asymmetric, such as a comparatively short rod shape having a circular or elliptical or square or rectangular cross-sections, also for example and without limitation. In an exemplary or representative embodiment, the grip 130 is located at or about the lower one-quarter to one-half of the shaft 142, for the user to continue to be able to grasp grip 130 and manipulate the gate 125 when fully retracted into the bore 195.

Figure 8:
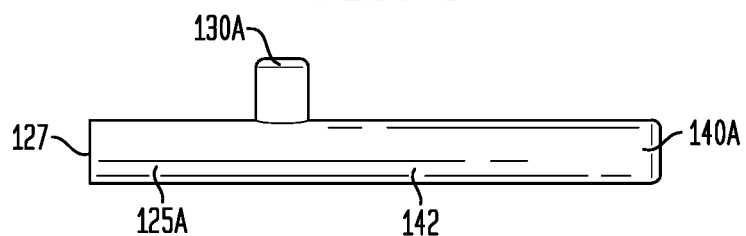
FIG. 8 is a diagram illustrating a side view of an exemplary or representative second embodiment of a gate of an exemplary or representative multi-glide locking snap hook fastener embodiment.

FIG. 8 is a diagram illustrating a side view of an exemplary or representative second embodiment of a gate 125A of an exemplary or representative multi-glide locking snap hook fastener 100 embodiment. For this second embodiment, grip 130A of the gate 125A is configured as a unitary tab or tab shape which has the combined functionality of the neck and head parts (or portions) 165, 170, namely, the grip 130A is both disposed or arranged (and sized) both for movement within and along the multipart channel 120, and extends out to the exterior of the body 105 and is exposed for grasping and manipulation by the user. The grip 130A may also have any of a plurality of shapes and configurations as discussed above, for example and without limitation. The gate 125A is also illustrated as having a comparatively flat (with curved edges) first end 140A. Those having skill in the mechanical arts will recognize that the gates 125, 125A function equivalently, that innumerable variations are available, and that all such gate variations and grip variations are considered equivalent and within the scope of the present disclosure. For ease of reference and explanation for the remainder of the disclosure, the gates 125, 125A are collectively referred to as a gate 125, it being understood that any and all such gate arrangements or configurations are included.

Referring to the Figures, such as FIGS. 6 and 9-12, the opening and unlocking of the multi-glide locking snap hook fastener 100 requires a series or succession of a plurality of movements of the gate 125 in different directions relative to the base 115. This plurality of different movements, such as downwards (longitudinally) and sideways (transversely), or combinations of such different movements, is effectively implemented and controlled by the arrangement or configuration of the multipart channel 120 and the movement of the grip 130 (typically and more specifically via the neck 165 of the grip 130) within the multipart channel 120. In several of the exemplary or representative embodiments, three (or more) different movements of the gate 125 are utilized. Those having skill in the mechanical arts will recognize, however, that only a plurality (two) of different movements are necessary to achieve at least some locking and security functionality of the present disclosure.

As illustrated for the multi-glide locking snap hook fastener 100 embodiment of FIGS. 1-6, 9-14, 19 and 20, a first embodiment of the multipart channel 120 is comprised of three contiguous and communicating (connected) segments, first channel segment 120A arranged or disposed longitudinally along a first portion 111 (along the length) of the base 115, contiguous and communicating with a second channel segment 120B arranged or disposed transversely across a second portion 112 (along the width) of the base 115, which in turn is contiguous and communicating with a third channel segment 120C arranged or disposed longitudinally along a third portion 113 (also along the length) of the base 115 (i.e., offset longitudinally from the first portion 111 along the length of the base 115 and further offset transversely from the first channel segment 120A by the transverse length of the second channel segment 120B along second portion 112), all forming and defining a unitary, continuous multipart channel 120.

The arrangement of the channel segments of the multipart channel 120 may also be equivalently viewed or described as the various channel segments 120A, 120B, and 120C angularly offset from each other while nonetheless being contiguous and communicating with each other to form a unitary, continuous multipart channel 120. For example, the first channel segment 120A is arranged or disposed longitudinally along a first portion 111 of the base 115, the contiguous and communicating second channel segment 120B is arranged or disposed at a first offset angle $\beta_1$ with respect to the first channel segment 120A, and the contiguous and communicating third channel segment 120C is arranged or disposed at a second offset angle $\beta_2$ with respect to the second channel segment 120B. As illustrated for the multi-glide locking snap hook fastener 100 embodiment of FIGS. 1-6, 9-14, 19 and 20, the offset angles $\beta_1$ and $\beta_2$ are typically each between 85 degrees and 95 degrees, or more specifically between 87 degrees and 93 degrees, or more specifically closer to or about 90 degrees. For the variations of the multipart channels 120 illustrated in FIGS. 15-18, the offset angles are not symmetric with each other and many of the offset angles are not right angles (but may be acute or obtuse angles as discussed below). Accordingly, any and all such offset angles of the contiguous and communicating channel segments of the multipart channel 120 are within the scope of the present disclosure.

Figure 9:
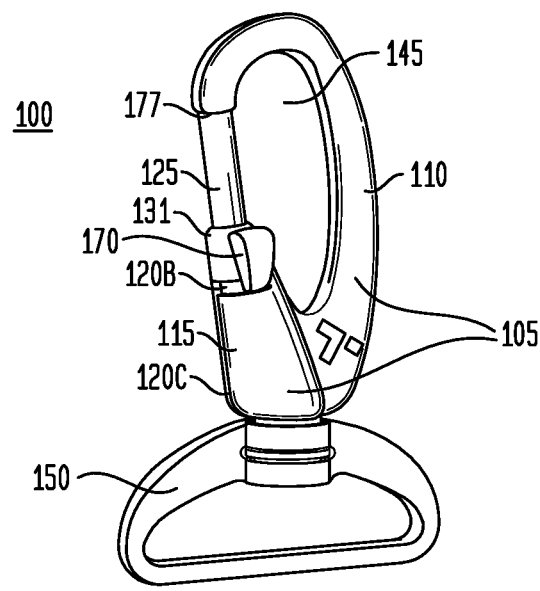
FIG. 9 is a second diagram illustrating an isometric view of an exemplary or representative multi-glide locking snap hook fastener embodiment in the first closed configuration with a first gate position or orientation.
Figure 10:
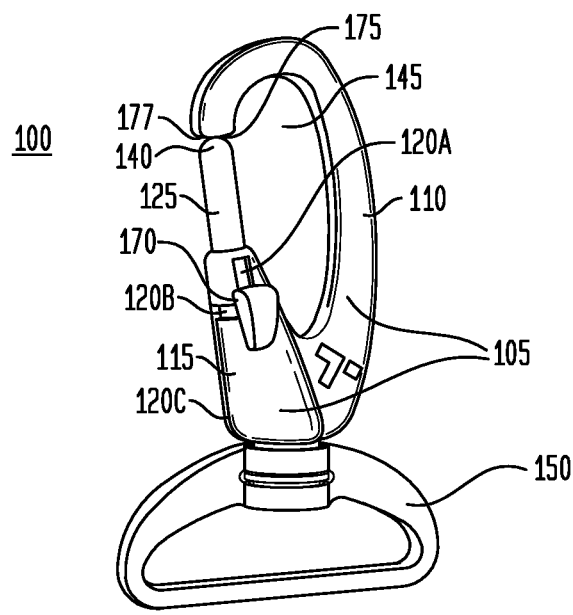
FIG. 10 is a diagram illustrating an isometric view of an exemplary or representative multi-glide locking snap hook fastener embodiment in the second closed configuration with a second gate position or orientation.
Figure 11:
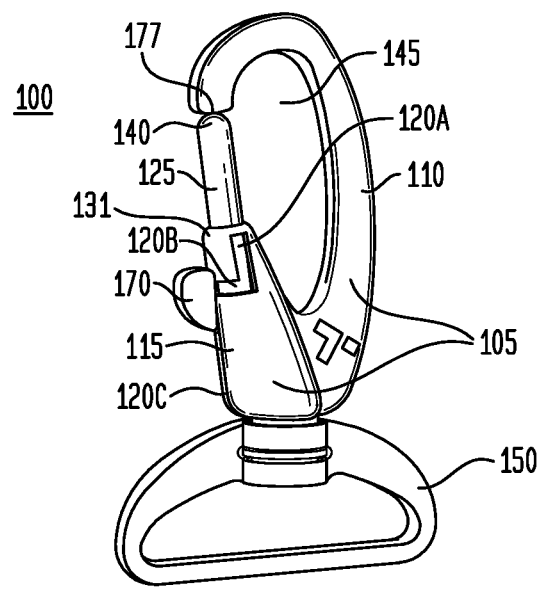
FIG. 11 is a diagram illustrating an isometric view of an exemplary or representative multi-glide locking snap hook fastener embodiment in the second closed configuration with a third gate position or orientation.
Figure 12:
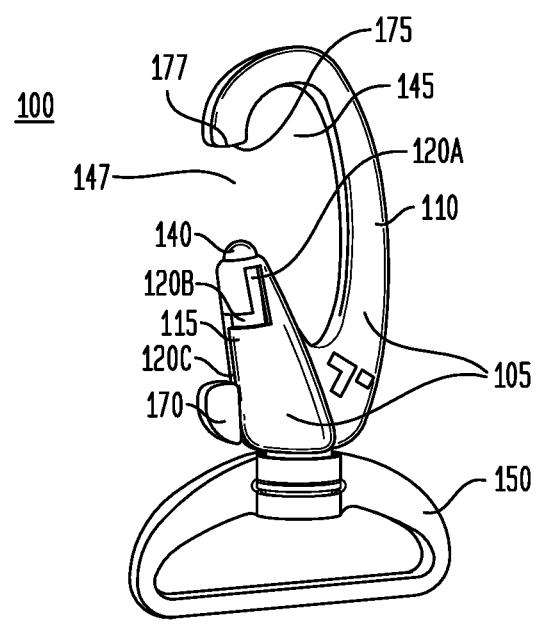
FIG. 12 is a diagram illustrating an isometric view of an exemplary or representative multi-glide locking snap hook fastener embodiment in an unlocked and open configuration with a fourth gate position or orientation.
Figure 19:
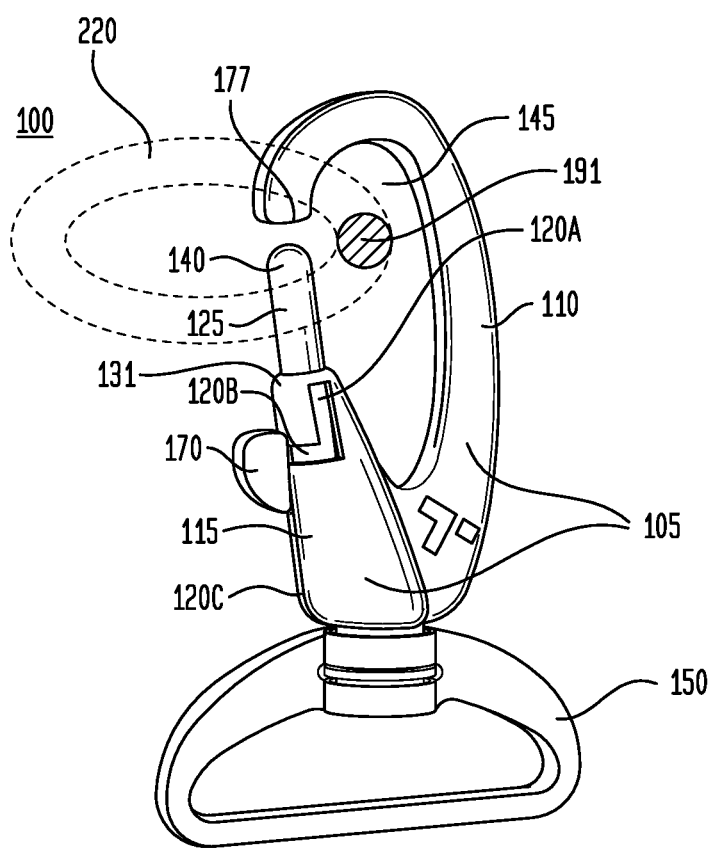
FIG. 19 is a diagram illustrating an isometric view of an exemplary or representative multi-glide locking snap hook fastener embodiment in the alternative second closed configuration with the third gate position or orientation.

FIGS. 9-12 and 19 serve to illustrate an exemplary or representative sequence of operations to open and unlock the exemplary or representative multi-glide locking snap hook fastener 100. FIG. 9 is a second diagram illustrating an isometric view of an exemplary or representative multi-glide locking snap hook fastener 100 embodiment in the first closed configuration (or position) with a first gate 125 position or orientation. FIG. 10 is a diagram illustrating an isometric view of an exemplary or representative multi-glide locking snap hook fastener 100 embodiment in the second closed configuration (or position) with a second gate 125 position or orientation. FIG. 11 is a diagram illustrating an isometric view of an exemplary or representative multi-glide locking snap hook fastener 100 embodiment in the second closed configuration (or position) with a third gate 125 position or orientation. FIG. 12 is a diagram illustrating an isometric view of an exemplary or representative multi-glide locking snap hook fastener 100 embodiment in an unlocked and open configuration (or position) with a fourth gate 125 position or orientation. FIG. 19 is a diagram illustrating an isometric view of an exemplary or representative multi-glide locking snap hook fastener 100 embodiment in an alternative second closed configuration (or position) with a third gate 125 position or orientation. FIGS. 9-12 also illustrated different widths of the channel segments forming the multipart channel 120, as additional examples.

Beginning with the first closed configuration (or position) of the multi-glide locking snap hook fastener 100 with a first gate 125 position in which the first end 140 of the gate 125 is engaging with (and inserted into) the mating recess 175, i.e., fully closed, as illustrated in FIG. 9, the gate 125 is partially retracted into the bore 195 by being first moved longitudinally downward into a second gate position (toward the second end 133 of the base 115, also illustrated as directional arrow 122 in FIG. 6), with the neck 165 (via grip 130) or grip 130A traversing the length of the first channel segment 120A and compressing the bias spring 135 (as a first or initial compression). The resulting arrangement or configuration of the multi-glide locking snap hook fastener 100 is illustrated in FIG. 10, in which the multi-glide locking snap hook fastener 100 is still in a closed position (as the second closed configuration (or position)) while the gate 125 is in the second gate position, such that a first movement (retraction) of the gate 125 is insufficient to fully open the multi-glide locking snap hook fastener 100 (i.e., sufficiently closed (or insufficiently open) relative to the size of an attachment ring 220 such that an attachment ring 220 cannot be released from or inserted into the interior region 145), providing added security against inadvertent or unwanted movement of the gate 125. For example, a quick, first movement to unlock the multi-glide locking snap hook fastener 100 by a purported or would-be thief would be unavailing, and the multi-glide locking snap hook fastener 100 would remain in a closed arrangement or configuration and still coupled around or through an attachment ring 220.

It should be noted, and as discussed in greater detail below, that in the second closed configuration, the gate 125 has only been partially retracted, enough for the first end 140 of the gate 125 to no longer be inserted into and nested within the mating recess 175, but nonetheless sufficiently close to the coupling end 177 of the hook 110 that any object (such as an attachment ring 220 or loop for a briefcase, purse, suitcase, or other carrying bag) cannot be removed from (or inserted into) the interior 145 of the multi-glide locking snap hook fastener 100. In this second closed configuration, the first end 140 of the gate 125 may be abutting the end 177 of the hook 110, or may have some separation distance ("B" discussed below). For example, as illustrated in FIGS. 10 and 11, in this second closed configuration, the first end 140 of the gate 125 may be abutting the end 177 of the hook 110 (as the second closed configuration) as illustrated, or may be separated from the hook 110 by a distance not to exceed the narrowest width of an enclosed object (as the alternative second closed configuration), such separated by a distance not to exceed the cross-sectional diameter of an attaching ring 220, as illustrated in and as discussed below with reference to FIGS. 13 and 19. The spacing or distance (if any) of the first end 140 of the gate 125 from the end 177 of the hook 110 in the second closed configuration and/or alternative second closed configuration is determined by the depth of the mating recess 175 and corresponding length of the first channel segment 120A in the longitudinal dimension.

Continuing with the next step of the opening process, the gate 125 is rotated within the bore 195 into a third gate position by moving the neck 165 (via grip 130) or grip 130A transversely across a portion of the base 115 (directional arrow 124 in FIG. 6), with the neck 165 (or grip 130A) traversing the length of the second channel segment 120B while the initial (or first) compression of bias spring 135 is maintained (for this multipart channel 120 arrangement). The resulting arrangement or configuration of the multi-glide locking snap hook fastener 100 is illustrated in FIG. 11, in which the multi-glide locking snap hook fastener 100 is still in a closed position (second closed configuration or alternative second closed configuration) while the gate 125 is in the third gate position, such that a sequential second movement of the gate 125 continues to be insufficient to (fully) open the multi-glide locking snap hook fastener 100.

Continuing with the next, third step of the opening process, the gate 125 is again moved longitudinally downward (directional arrow 126 in FIG. 6) into a fourth gate position, with the neck 165 (via grip 130) or grip 130A traversing the length of the third channel segment 120C and further compressing the bias spring 135 (as a second compression). The resulting arrangement or configuration of the multi-glide locking snap hook fastener 100 is illustrated in FIG. 12, in which the multi-glide locking snap hook fastener 100, after three separate movements of the gate 125, is now in an open configuration or position, such that an object (e.g., an attachment ring 220) may now be removed from or inserted into the interior region 145 of the multi-glide locking snap hook fastener 100.

While the first channel segment 120A and the third channel segment 120C of the multipart channel 120 are illustrated as generally or substantially orthogonal to the second channel segment 120B, i.e., at about ninety degree angles to each other, those having skill in the art will recognize that innumerable multipart channel 120 configurations and/or layouts are available and are considered equivalent and within the scope of the present disclosure. For example and without limitation, the multipart channel 120 may have more of a zig-zag configuration in which the various first and third channel segments 120A, 120C are configured at more acute offset angles or more obtuse offset angles to the second channel segment 120B or to each other, and are not merely either longitudinal or transverse, but each may have both longitudinal and transverse vector orientations with respect to the base 115. Several other exemplary or representative multipart channel 120 configurations are illustrated and discussed below with reference to FIGS. 15-18.

FIG. 13 is a diagram illustrating a side or side and front view detail 128 from FIG. 5 of a portion of a gate 125, a grip 130, a base 115, a hook 110 and their relative dimensions of an exemplary or representative multi-glide locking snap hook fastener 100 embodiment in the alternative second closed configuration (i.e. partially open or equivalently partially closed) compared to the diameter ("D") of a cross-section (191) of an attachment ring 220 (added in FIG. 13 and not shown in FIG. 5), as mentioned above. It should also be noted that FIG. 13 is not necessarily drawn to scale, and instead may have different proportions to emphasize certain features. FIG. 19 also illustrates a cross-section 191 of an exemplary or representative attachment ring 220 (illustrated using dashed lines in FIG. 19) which may be fastened or inserted within the interior region 145 of a multi-glide locking snap hook fastener 100. As mentioned above, depending upon the depth of the mating recess 175 (illustrated as having a depth "A"), the length of the first channel segment 120A (illustrated as having a length "C" as measured in the longitudinal dimension), and also the length $F_2$ (discussed below with reference to FIG. 14) of the neck 165 or grip 130 within the first channel segment 120A, initial retraction of the gate 125 into the bore 195 (with the neck 165 or grip 130A) traversing the length of the first channel segment 120A (and also possibly the second channel segment 120B, as illustrated)) may result in this alternative second closed configuration as an available variation, in which first end 140 of the gate 125 is no longer abutting the end 177 of the hook 110, and instead is separated from the hook 110 by a distance (illustrated as having a length "B") not to exceed the narrowest width of an enclosed object, illustrated in FIG. 13 as the cross-section 191 of an attaching ring 220 having a diameter "D".

Any such separation distance "B" is determined by the depth "A" of the mating recess 175 compared to the distance traversed in the longitudinal dimension by the neck 165 or grip 130 moving along the length "C" in the longitudinal dimension of the first channel segment 120A, with the maximum distance which can be traversed being equal to $C-F_2$. Accordingly, the gap or separation distance B is $B=((C-F_2)-A)$ when $C-F_2>A$, while there is no gap (B=0) when $C-F_2<A$. To provide the desired security however, all that is required is that the gap distance "B" is less than the narrowest diameter of the attached object ("D"), such that the width of the object at all times exceeds the gap distance "B", i.e., B<D, resulting in $C<((A+D)+F_2)$. If the narrowest diameter of the attached object is not known in advance for determining the required depth "A" of the mating recess 175 and the maximum length "C" in the longitudinal dimension of the first channel segment 120A, then prudent design might indicate that the maximum length "C" in the longitudinal dimension of the first channel segment 120A should be substantially or about equal to or less than the depth "A" of the mating recess 175 (as shown in the second closed configuration or position illustrated in FIGS. 2, 10 and 11) plus the amount of room $F_2$ taken up by the neck 165 or grip 130, within a selected or predetermined variance and/or tolerance level (or manufacturing tolerance level or variation), such as plus (or minus) some predetermined percentage of the typical diameter of the object to be attached, such as an attachment ring 220 to a purse or briefcase, i.e., C<A+a predetermined variance (with the predetermined variance accounting for the amount of room $F_2$ taken up by the neck 165 or grip 130, and possibly at least some diameter of an attachment ring 220, and manufacturing tolerances, for example and without limitation). It should be noted that for those first channel segments 120A which extend not merely longitudinally but also transversely, the length dimension "C" for those embodiments is the longitudinal dimension.

In a representative embodiment, then, the first channel segment 120A has a predetermined length "C" in the longitudinal dimension equal to or less than a combined length of a depth "A" of the mating recess and a predetermined variance, with the predetermined variance accounting for $F_2$, the amount of room taken up by the neck 165 or grip 130, and possibly at least some diameter of an attachment ring 220 and manufacturing tolerances, resulting in C<A+a predetermined variance.

This can also be applied to the movement of the neck 165 or grip 130 in the second channel segment 120B, to maintain the alternative second closed configuration, wherein the second channel segment 120B is arranged a predetermined distance from a first end 131 of the base 115, the predetermined distance equal to or less than a combined length of a depth "A" of the mating recess in the longitudinal dimension plus the predetermined variance, plus whatever distance the first channel segment 120A is offset from the first end 131 of the 131 of the base 115, as illustrated. It should be noted that for those second channel segments 120B which extend not merely transversely but also longitudinally, the predetermined distance from the first end 131 of the base 115 is also determined in the longitudinal dimension for those embodiments.

Figure 14:
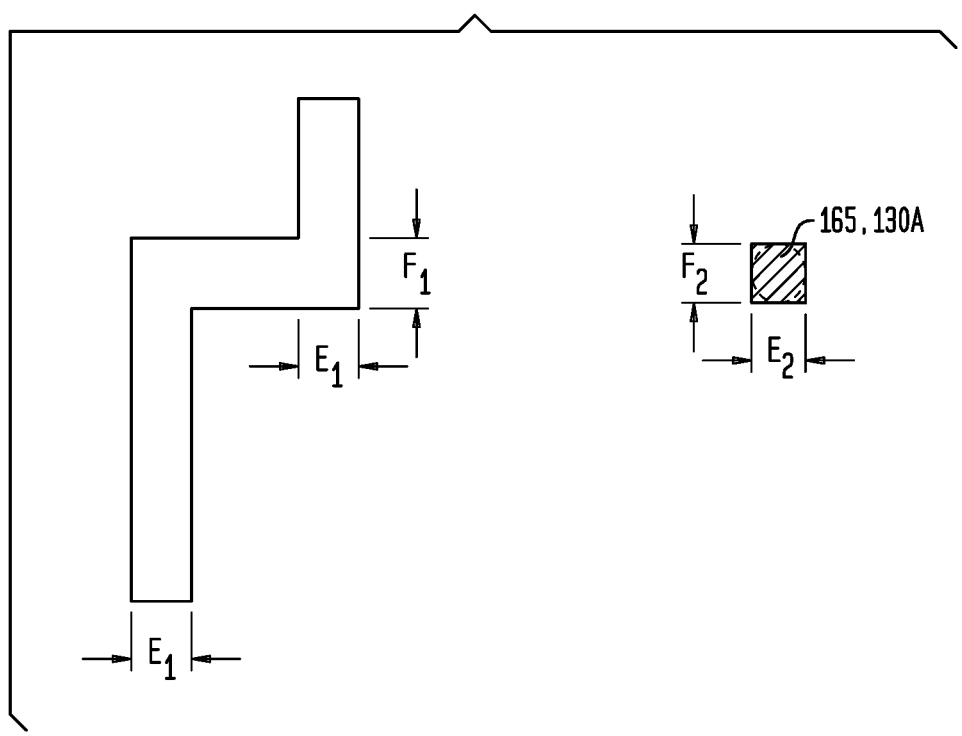
FIG. 14 is a diagram illustrating relative dimensions of a channel and gate neck or grip of an exemplary or representative multi-glide locking snap hook fastener embodiment.

FIG. 14 is a diagram illustrating relative dimensions of a multipart channel 120 and neck 165 (or grip 130A) of an exemplary or representative multi-glide locking snap hook fastener 100 embodiment. As illustrated, the neck 165 (or grip 130A), regardless of shape and regardless of being symmetric or asymmetric, should be dimensioned to be able to be moved manually through the multipart channel 120. Assuming the multipart channel 120 has consistent dimensions, such that the width "$E_1$" of the first and third channel segments 120A and 120C are the same, then the width "$E_2$" of the neck 165 (or grip 130A) should be less than (or possibly equal to) the width "$E_1$" of the first and third channel segments 120A and 120C, and the length "$F_2$" of the neck 165 (or grip 130A) should be less than (or possibly equal to) the width "$F_1$" of the second channel segment 120B. In an exemplary embodiment, the length and width of the neck 165 (or grip 130A) is smaller than the channel widths for ease of movement and operation of the gate 125.

Figure 15:
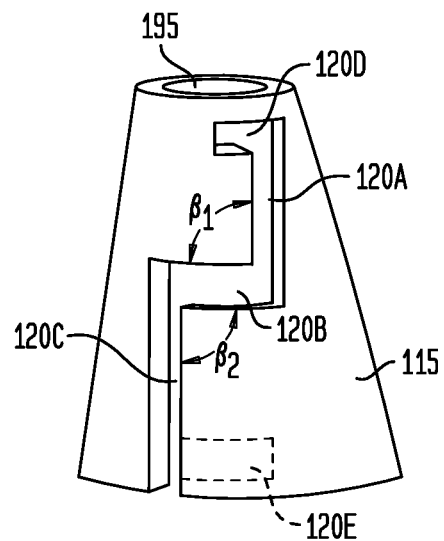
FIG. 15 is a diagram illustrating a partial front isometric view of a portion of a base having an exemplary or representative second configuration of a multipart channel of an exemplary or representative multi-glide locking snap hook fastener embodiment.

FIG. 15 is a diagram illustrating a partial front isometric view of a portion of a base 115 having of an exemplary or representative second configuration of a multipart channel 120 of an exemplary or representative multi-glide locking snap hook fastener 100 embodiment. As illustrated, another fourth channel segment 120D is included, which provides an additional, first locking recess for the neck 165 (or grip 130A), holding or maintaining the gate 125 in a fourth gate position and effectively locking the multi-glide locking snap hook fastener 100 in the first, fully closed configuration or position. Also illustrated, another fifth channel segment 120E (illustrated in dashed lines) may be included as another option, which provides an additional, second locking recess for the neck 165 (or grip 130A), placing the gate 125 in a fifth gate position and holding of locking the multi-glide locking snap hook fastener 100 in an open configuration or position.

Figure 16:
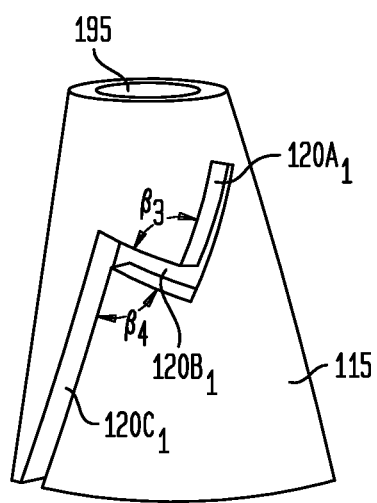
FIG. 16 is a diagram illustrating a partial front isometric view of a portion of a base having an exemplary or representative third configuration of a multipart channel of an exemplary or representative multi-glide locking snap hook fastener embodiment.

FIG. 16 is a diagram illustrating a partial front isometric view of a portion of a base 115 having of an exemplary or representative third configuration of a multipart channel 120 of an exemplary or representative multi-glide locking snap hook fastener 100 embodiment. In this third configuration, the first, second and third channel segments $120A_1$, $120B_1$ and $120C_1$ are oriented obliquely on the base 115, and further the third configuration of a multipart channel 120 has an acute angle $\beta_3$ between the first channel segment $120A_1$ and the second channel segment $120B_1$ and has an acute angle $\beta_4$ the third channel segment $120C_1$ and the second channel segment $120B_1$, resulting in a zig-zag configuration of the multipart channel 120, as mentioned above, and otherwise functions similarly to the multipart channel 120 illustrated in FIGS. 1-6 and 9-12.

Figure 17:
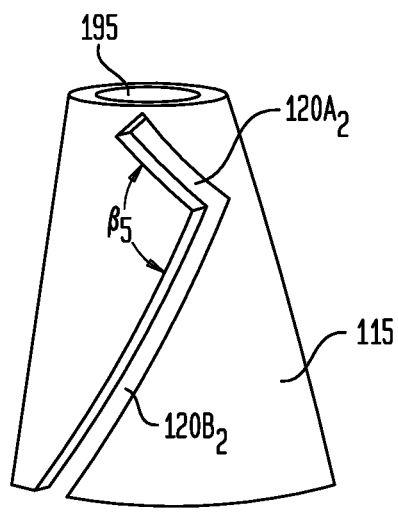
FIG. 17 is a diagram illustrating a partial front isometric view of a portion of a base having an exemplary or representative fourth configuration of a multipart channel of an exemplary or representative multi-glide locking snap hook fastener embodiment.

FIG. 17 is a diagram illustrating a partial front isometric view of a portion of a base 115 having an exemplary or representative fourth configuration of a multipart channel 120 of an exemplary or representative multi-glide locking snap hook fastener 100 embodiment. In this fourth configuration, the multipart channel 120 comprises two channel segments, a first channel segment $120A_2$ and a second channel segment $120B_2$, both of which are oriented obliquely in the base 115, i.e., each of the first channel segment $120A_2$ and the second channel segment $120B_2$ extend both longitudinally and transversely along and across the base 115, again requiring two distinct and different movements of the user to retract the gate 125 into an open configuration or position. In this fourth configuration, the first channel segment $120A_2$ has an obtuse angular offset (greater than 90 degrees) $\beta_5$ from the second channel segment $120B_2$. This fourth configuration of a multipart channel 120 also results in a partial zig-zag configuration of the multipart channel 120, and otherwise functions similarly to the multipart channel 120 illustrated in FIGS. 1-6 and 9-12.

Figure 18:
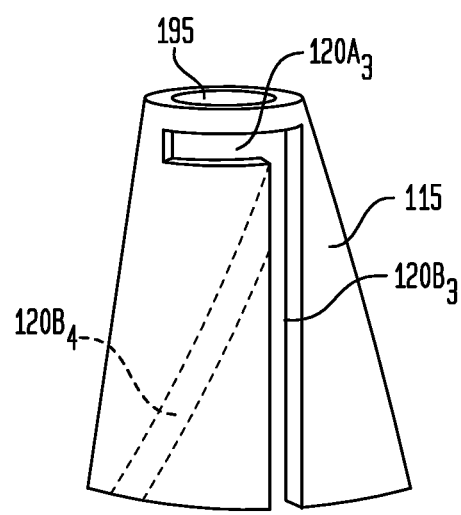
FIG. 18 is a diagram illustrating a partial front isometric view of a portion of a base having an exemplary or representative fifth and sixth configurations of a multipart channel of an exemplary or representative multi-glide locking snap hook fastener embodiment.

FIG. 18 is a diagram illustrating a partial front isometric view of a portion of a base 115 having an exemplary or representative fifth configuration of a multipart channel 120 of an exemplary or representative multi-glide locking snap hook fastener 100 embodiment. In this fifth configuration, the multipart channel 120 also comprises two channel segments, a first channel segment $120A_3$ and a second channel segment $120B_3$, in which the first channel segment $120A_3$ extends or is oriented or arranged transversely on or across the base 115, and the second channel segment $120B_3$ extends or is oriented or arranged longitudinally along the base 115, again requiring two distinct and different movements of the user to retract the gate 125 into an open configuration or position. This fifth configuration of a multipart channel 120 results in an inverted "L" configuration of the multipart channel 120, and otherwise functions similarly to the multipart channel 120 illustrated in FIGS. 1-6 and 9-12. In another embodiment, the second channel segment $120B_4$ (illustrated in dashed lines) instead extends or is oriented or arranged both longitudinally and transversely along and across the base 115, resulting in a "7-shaped" configuration rather than an inverted L, again requiring two distinct and different movements of the user to retract the gate 125 into an open configuration or position, and otherwise functions similarly to the multipart channel 120 illustrated in FIGS. 1-6 and 9-12.

Accordingly, a representative embodiment of multi-glide locking snap hook fastener 100 may have any of these various multipart channel 120 arrangements or configurations, and those having skill in the art will recognize that innumerable variations of multipart channels 120 are available, equivalent to those illustrated herein, and within the scope of the disclosure. In addition, any of these various multipart channel 120 arrangements or configurations may be "mixed and matched", i.e., provided as other permutations or combinations, with different offset angles, as mirror images, with different starting locations, e.g., left-to-right rather than right-to-left or up and down. For example and without limitation, a channel segment 120C may be provided at an acute offset angle $\beta_4$ rather than a right angle $\beta_2$; both a channel segment 120A and a channel segment 120C may be provided at acute offset angles $\beta_3$ and $\beta_4$ rather than right angles $\beta_1$ and $\beta_2$ while maintaining the channel segment 120B in a transverse direction, resulting in channel segments 120A and 120C extending both longitudinally and transversely (in a zig-zag); and so on.

In addition, any of these various multipart channel 120 arrangements or configurations may be arranged and therefore numbered differently for any selected combination or permutation of channel segments forming a selected multipart channel 120 of a plurality of available multipart channels 120 which could be formed using any such permutation or combination. Also for example and without limitation: (1) a multipart channel 120 may comprise a channel segment 120B as a first channel segment and a channel segment 120C as a second channel segment; or (2) a multipart channel 120 may comprise a channel segment 120D as a first channel segment, a channel segment $120A_1$ as a second channel segment, a channel segment $120B_1$ as a third channel segment, and a channel segment $120C_1$ as a fourth channel segment; or (3) a multipart channel 120 may comprise a channel segment $120A_2$ as a first channel segment, a channel segment 120B as a second channel segment, and a channel segment $120C_1$ as a third channel segment; or (4) a multipart channel 120 may comprise a channel segment $120A_2$ as a first channel segment, a channel segment $120B_1$ as a second channel segment, and a channel segment 120C as a third channel segment.

Accordingly, a representative embodiment of a multi-glide locking snap hook fastener 100 is or may be referred to generally as a locking snap hook fastener or simply as a fastener, comprising: a body 105 comprising a curved hook 110 and a base 115, the base 115 comprising a longitudinal bore 195; the base 115 further comprising a multipart channel 120 extending radially into the bore 195 and comprising a plurality of channel segments, a first channel segment of the plurality of channel segments extending along or across a first part (e.g., 111) of the base 115, and at least one second channel segment of the plurality of channel segments extending along or across at least one second part (e.g., 112) of the base 115, the at least one second channel segment offset at a first angle (e.g., $\beta_1$, $\beta_2$, $\beta_3$, $\beta_4$, or $\beta_5$) from the first channel segment; and a gate 125 arranged within the bore 195, the gate 125 comprising an elongated shaft 142 and a grip 130 extending from the elongated shaft 142 and into the multipart channel 120, with the gate moveable both longitudinally and rotatably within the bore. As discussed above, when the gate is in a first position with the grip arranged within the first channel segment, the fastener has a first (or second) closed configuration, and wherein when the gate is in a second position with the grip arranged within the at least one second channel segment, the fastener has an open configuration.

In a representative embodiment such as shown in FIGS. 1-6, 15 and 16, the at least one second channel segment (e.g.,

120B, 120B₁) extends along or across the at least one second part of the base and offset at the first angle (e.g., β₁, or β₃) from the first channel segment; and the multipart channel further comprises a third channel segment (e.g., 120C, 120C₁) of the plurality of channel segments, the third channel segment extending along or across a third part of the base, the third channel segment offset at a second angle (e.g., β₂, or β₄) from the at least one second channel segment. Equivalently, the representative embodiment such as shown in FIGS. 1-6, 15 and 16, could instead be described as the at least one second channel segment further comprising: a second channel segment (e.g., 120B, 120B₁) extending along or across the at least one second part of the base and offset at the first angle (e.g., β₁, or β₃) from the first channel segment; and a third channel segment (e.g., 120C, 120C₁) of the plurality of channel segments, the third channel segment extending along or across a third part of the base, the third channel segment offset at a second angle (e.g., β₂, or β₄) from the second channel segment. As discussed above, when the gate is in a first position with the grip arranged within the first channel segment, the fastener has a first closed configuration, wherein when the gate is in a second position with the grip arranged within the second channel segment, the fastener has a second closed configuration, and wherein when the gate is in a third position with the grip arranged within the third channel segment, the fastener has an open configuration.

In a representative embodiment such as shown in FIG. 15, a fastener may further comprise a fourth channel segment (e.g., 120D) of the plurality of channel segments, the fourth channel segment extending along or across a fourth part of the base, the fourth channel segment offset at a third angle from the first channel segment, the fourth channel segment contiguous and communicating with the first channel segment, and when the gate is in a fourth position with the grip arranged within the fourth channel segment, the fastener has a locked first closed position. Such a fastener may also include a fifth channel segment of the plurality of channel segments, the fifth channel segment extending along or across a fifth part of the base, the fifth channel segment offset at a fourth angle from the third channel segment, the fifth channel segment contiguous and communicating with the third channel segment, and when the gate is in a fifth position with the grip arranged within the fifth channel segment, the fastener has a locked open position.

Also for example, when the first and second offset angles are substantially right angles, that the first channel segment and the third channel segment are substantially orthogonal to the second channel segment; and when the first and second offset angles are each an acute angle or an obtuse angle, the multipart channel has a zig-zag configuration.

FIG. 20 is a diagram illustrating an isometric view of an exemplary or representative multi-glide locking snap hook fastener embodiment 100 coupled through a D-shaped coupling ring 150 to a carrying strap 210 and further removably coupled to an attachment ring 220A (also D-shaped) of a carrying bag 200 such as a purse, briefcase, suitcase, or other bag. As illustrated, the carrying bag (such as a purse includes) an interior pocket shown closed by a zipper closure 215, and other pockets (also shown closed by zipper closures 225, 230), such as a front pocket 240. The multi-glide locking snap hook fastener 100 may be coupled and uncoupled to the attachment ring 220A, such as for locking the carrying bag around a post or chair, for example.

Several unique features and advantages of the various embodiments of the present disclosure are readily apparent. The exemplary embodiments provide for increased security of a fastener, requiring several different and distinct movements to open the exemplary or representative multi-glide locking snap hook fastener 100, without requiring a separate locking pin or collar arrangement. This also serves to decrease the concerns of a traveler or commuter, for example, knowing that a would-be pickpocket or other thief cannot quickly and surreptitiously undo and open the fastener, such as to quickly steal a purse, briefcase, shoulder bag or other carrying bag. The exemplary or representative multi-glide locking snap hook fastener 100 may also be implemented aesthetically, with designs which do not look or feel utilitarian but which nonetheless have superior attachment and security functionality.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A fastener, comprising:
   a body comprising a curved hook and a base, the base comprising a longitudinal bore and a multipart channel extending radially into the longitudinal bore the base having a first end and a second end;
   the multipart channel comprising:
   a first channel segment spaced apart from the first end of the base and extending linearly along or across a first part of the base and toward the second end of the base;
   a second channel segment extending laterally or both laterally and longitudinally along or across a second part of the base, the second channel segment contiguous and communicating with the first channel segment, and the second channel segment offset at a first angle from the first channel segment; and
   a third channel segment extending linearly along or across a third part of the base and extending further toward the second end of the base than the first channel segment, the third channel segment contiguous and communicating with the second channel segment, and the third channel segment offset at a second, obtuse angle from the second channel segment;
   and
   a gate arranged within the longitudinal bore, the gate comprising an elongated shaft and a grip extending from the elongated shaft and into the multipart channel, the gate moveable both longitudinally and rotatably within the longitudinal bore.

2. The fastener of claim 1, wherein when the gate is in a first position with the grip arranged within the first channel segment, the fastener has a first closed configuration, wherein when the gate is in a second position with the grip arranged within the second channel segment, the fastener has a second closed configuration, and wherein when the gate is in a third position with the grip arranged within the third channel segment, the fastener has an open configuration.

3. The fastener of claim 2, wherein the multipart channel further comprises:
   a fourth channel segment extending along or across a fourth part of the base, the fourth channel segment offset at a third angle from the first channel segment, the fourth channel segment contiguous and communicating with the first channel segment, and when the gate is in a fourth position with the grip arranged within the fourth channel segment, the fastener has a locked first closed position.

4. The fastener of claim 3, wherein the multipart channel further comprises:
   a fifth channel segment extending along or across a fifth part of the base, the fifth channel segment offset at a fourth angle from the third channel segment, the fifth channel segment contiguous and communicating with the third channel segment, and when the gate is in a fifth position with the grip arranged within the fifth channel segment, the fastener has a locked open position.

5. The fastener of claim 1, wherein the first angle is a right angle to provide that the first channel segment is orthogonal to the second channel segment.

6. The fastener of claim 1, wherein the first angle is an acute angle or an obtuse angle.

7. The fastener of claim 1, wherein the grip further comprises:
   a neck coupled to the elongated shaft and arranged and moveable within the multipart channel; and
   a head extending from the neck to an exterior of the base for user manipulation, wherein the head has a shape selected from the group consisting of: button-shaped, pear-shaped, triangular, rectangular, spherical, tab-shaped, bulb or bulbous-shaped, teardrop-shaped, and combinations thereof.

8. The fastener of claim 1, wherein the curved hook further comprises a mating recess for receiving a first end of the gate for a first closed configuration of the fastener.

9. The fastener of claim 8, wherein the first channel segment has a predetermined length in a longitudinal dimension equal to or less than a combined length of a depth of the mating recess and a predetermined variance, and wherein the second channel segment is arranged a predetermined distance from the first end of the base, the predetermined distance equal to the predetermined length plus an offset distance.

10. The fastener of claim 1, further comprising:
    a bias spring arranged within the longitudinal bore adjacent to the gate;
    a coupling ring; and
    wherein the body further comprises:
    an integrally-formed body shaft rotatably coupled to the coupling ring, the integrally-formed body shaft having an axis of rotation relative to the coupling ring.

11. The fastener of claim 10, wherein the longitudinal bore is angularly offset from the integrally-formed body shaft and the axis of rotation of the integrally-formed body shaft; wherein the base is substantially frustoconical and tapers in diameter from the second end to the first end; and wherein the curved hook extends in a C-shape curve from a lower half of the base at the second end of the base and the curved hook tapers in width.

12. The fastener of claim 1, wherein the first and third channel segments each extend at least partially longitudinally along the base and the second channel segment extends both longitudinally and transversely along the base.

13. The fastener of claim 1, wherein each of the first, second and third channel segments extend both longitudinally and transversely along the base.

14. A fastener, comprising:
a body comprising a curved hook and a base, the base comprising a longitudinal bore;
the base further comprising a multipart channel extending radially into the longitudinal bore and comprising:
a first channel segment extending at least partially longitudinally along or across a first part of the base;
a second channel segment extending along or across at least one second part of the base, the second channel segment offset at a first angle from the first channel segment, wherein the first angle is an obtuse angle; and
a third channel segment extending along or across a third part of the base, the third channel segment offset at a second angle from the second channel segment, wherein the second angle is an obtuse angle; and
a gate arranged within the longitudinal bore, the gate comprising an elongated shaft and a grip extending from the elongated shaft and into the multipart channel, the gate moveable both longitudinally and rotatably within the longitudinal bore.

15. The fastener of claim 14, wherein when the grip is arranged within the first channel segment, the fastener has a closed configuration, and wherein when the grip is arranged within the third channel segment, the fastener has an open configuration.

16. The fastener of claim 14, wherein the at least one second channel segment is contiguous and communicating with the first channel segment.

17. The fastener of claim 14, wherein when the gate is in a first position with the grip arranged within the first channel segment, the fastener has a first closed configuration, wherein when the gate is in a second position with the grip arranged within the second channel segment, the fastener has a second closed configuration, and wherein when the gate is in a third position with the grip arranged within the third channel segment, the fastener has an open configuration.

18. The fastener of claim 14, wherein the third channel segment is contiguous and communicating with the second channel segment and the second channel segment is contiguous and communicating with the first channel segment.

19. The fastener of claim 14, wherein the multipart channel further comprises:
a fourth channel segment extending along or across a fourth part of the base, the fourth channel segment offset at a third angle from the first channel segment, the fourth channel segment contiguous and communicating with the first channel segment, and when the gate is in a fourth position with the grip arranged within the fourth channel segment, the fastener has a locked first closed position.

20. The fastener of claim 19, wherein the multipart channel further comprises:
a fifth channel segment extending along or across a fifth part of the base, the fifth channel segment offset at a fourth angle from the third channel segment, the fifth channel segment contiguous and communicating with the third channel segment, and when the gate is in a fifth position with the grip arranged within the fifth channel segment, the fastener has a locked open position.

21. The fastener of claim 14, wherein the grip further comprises:
a neck coupled to the elongated shaft and arranged and moveable within the multipart channel; and
a head extending from the neck to an exterior of the base for user manipulation.

22. The fastener of claim 21, wherein the head has a shape selected from the group consisting of: button-shaped, pear-shaped, triangular, rectangular, spherical, tab-shaped, bulb or bulbous-shaped, teardrop-shaped, and combinations thereof.

23. The fastener of claim 14, wherein the curved hook further comprises a mating recess for receiving a first end of the gate for a first closed configuration of the fastener.

24. The fastener of claim 23, wherein the first channel segment has a predetermined length in a longitudinal dimension equal to or less than a combined length of a depth of the mating recess and a predetermined variance.

25. The fastener of claim 14, further comprising:
a bias spring arranged within the longitudinal bore adjacent to the gate;
a coupling ring; and
wherein the body further comprises:
an integrally-formed body shaft rotatably coupled to the coupling ring.

26. The fastener of claim 14, wherein the second channel segment extends both longitudinally and transversely along the base.

27. The fastener of claim 15, wherein the third channel segment extends at least partially longitudinally along the base.

28. A fastener, comprising:
a coupling ring;
a body comprising a base, a curved hook integrally-formed with the base, and a body shaft integrally-formed with the base, the base comprising a longitudinal bore and a multipart channel extending radially into the longitudinal bore, the body rotatably coupled through the body shaft to the coupling ring;
a bias spring arranged within the longitudinal bore;
the multipart channel comprising:
a first channel segment extending at least partially longitudinally along or across a first part of the base;
a second channel segment extending both longitudinally and transversely along or across a second part of the base, the second channel segment contiguous and communicating with the first channel segment, and the second channel segment offset at a first angle from the first channel segment; and
a third channel segment extending at least partially longitudinally along or across a third part of the base, the third channel segment contiguous and communicating with the second channel segment, and the third channel segment offset at a second angle from the second channel segment;
and
a gate arranged within the longitudinal bore and adjacent the bias spring, the gate moveable both longitudinally and rotatably within the longitudinal bore, the gate comprising a cylindrical shaft and a grip extending from the cylindrical shaft; the grip comprising: a neck coupled to the cylindrical shaft and arranged and moveable within the multipart channel; and a head extending from the neck to an exterior of the base for user manipulation.

29. The fastener of claim 28, wherein when the gate is in a first position with the neck of the grip arranged within the first channel segment, the fastener has a first configuration, wherein when the gate is in a second position with the neck of the grip arranged within the third channel segment, the fastener has an open configuration.

30. The fastener of claim 28, wherein each of the first and second angles is a right angle to provide that the first channel segment and the third channel segment are substantially orthogonal to the second channel segment; or wherein each of the first and second angles is either an acute angle or an obtuse angle.

31. The fastener of claim 28, wherein the curved hook further comprises a mating recess for receiving a first end of the gate for a first closed configuration of the fastener; wherein the first channel segment has a predetermined length in a longitudinal dimension equal to or less than a combined length of a depth of the mating recess and a predetermined variance.

32. The fastener of claim 28, wherein the bore is angularly offset from the body shaft and an axis of rotation of the body shaft relative to the coupling ring; wherein the base is substantially frustoconical and tapers in diameter from a second end to a first end; and wherein the curved hook extends in a C-shape curve from a lower half of the base at the second end of the base and the hook tapers in width.

33. The fastener of claim 28, wherein the first and third channel segments each extend both longitudinally and transversely along the base.

34. A fastener, comprising:
a coupling ring;
a body rotatably coupled to the coupling ring, the body having a base and a curved hook extending from the base to form an interior region, the base having a cylindrical bore extending longitudinally through the base, the curved hook having an end comprising a mating recess;
a bias spring arranged within the cylindrical bore;
a multipart channel extending radially from an exterior surface of the base into the cylindrical bore and comprising a first channel segment, a second channel segment contiguous and communicating with the first channel segment, and a third channel segment contiguous and communicating with the second channel segment, the first channel segment extending longitudinally and transversely along a first part of the base, the second channel segment extending longitudinally and transversely across a second part of the base, and the third channel segment extending longitudinally and transversely along a third part of the base and offset longitudinally and transversely from the first part of the base; and
a gate arranged within the cylindrical bore and adjacent to the bias spring, the gate further comprising a cylindrical shaft and a grip extending from the cylindrical shaft into the multipart channel, the gate moveable longitudinally and rotatably within the cylindrical bore into a plurality of gate positions.

35. A fastener, comprising:
a body comprising a curved hook and a base, the base comprising a longitudinal bore;
the base further comprising a multipart channel extending radially into the longitudinal bore and comprising:
a first channel segment extending both longitudinally and transversely along or across a first part of the base; and
at least one second channel segment extending both longitudinally and transversely along or across at least one second part of the base, the at least one second channel segment offset at a first angle from the first channel segment;
and
a gate arranged within the longitudinal bore, the gate comprising an elongated shaft and a grip extending from the elongated shaft and into the multipart channel, the gate moveable both longitudinally and rotatably within the longitudinal bore.

36. The fastener of claim 35, wherein the first angle is a right angle to provide that the first channel segment and the at least one second channel segment are substantially orthogonal to each other.

37. The fastener of claim 35, wherein the first angle is an obtuse angle.

38. The fastener of claim 35, wherein the at least one second channel segment is contiguous and communicating with the first channel segment.

39. The fastener of claim 35, wherein the multipart channel further comprises:
a third channel segment extending at least partially longitudinally along or across a third part of the base, the third channel segment offset at a second angle from the at least one second channel segment.

40. The fastener of claim 39, wherein the third channel segment is contiguous and communicating with the at least one second channel segment and the at least one second channel segment is contiguous and communicating with the first channel segment.

41. The fastener of claim 39, wherein the first and second angles are right angles to provide that the first channel segment and the third channel segment are orthogonal to the second channel segment.

42. The fastener of claim 39, wherein at least one of the first and second angles is an obtuse angle.

43. The fastener of claim 35, wherein the grip further comprises:
a neck coupled to the elongated shaft and arranged and moveable within the multipart channel; and
a head extending from the neck to an exterior of the base for user manipulation, wherein the head has a shape selected from the group consisting of: button-shaped, pear-shaped, triangular, rectangular, spherical, tab-shaped, bulb or bulbous-shaped, teardrop-shaped, and combinations thereof.

44. The fastener of claim 35, wherein the hook further comprises a mating recess for receiving a first end of the gate for a first closed configuration of the fastener.

45. The fastener of claim 44, wherein the first channel segment has a predetermined length in a longitudinal dimension equal to or less than a combined length of a depth of the mating recess and a predetermined variance.

46. The fastener of claim 35, further comprising:
a bias spring arranged within the longitudinal bore adjacent to the gate;
a coupling ring; and
wherein the body further comprises:
an integrally-formed body shaft rotatably coupled to the coupling ring.

* * * * *